US010656854B1

(12) United States Patent
Brown et al.

(10) Patent No.: US 10,656,854 B1
(45) Date of Patent: May 19, 2020

(54) METHOD AND PORTABLE STORAGE DEVICE WITH INTERNAL CONTROLLER THAT CAN SELF-VERIFY THE DEVICE AND SELF-CONVERT THE DEVICE FROM CURRENT MODE TO RENEWED MODE WITHOUT COMMUNICATING WITH HOST

(71) Applicant: APRICORN, Poway, CA (US)

(72) Inventors: Paul Cameron Brown, San Diego, CA (US); Phuoc Minh Thai, Poway, CA (US); Michael Lee McCandless, Poway, CA (US); Yuhsiang Su, San Diego, CA (US)

(73) Assignee: APRICORN, Poway, CA (US)

( * ) Notice: Subject to any disclaimer, the term of this patent is extended or adjusted under 35 U.S.C. 154(b) by 0 days.

(21) Appl. No.: 16/660,770

(22) Filed: Oct. 22, 2019

(51) Int. Cl.
*G06F 3/06* (2006.01)
*G06F 21/78* (2013.01)

(52) U.S. Cl.
CPC .......... *G06F 3/0622* (2013.01); *G06F 3/0623* (2013.01); *G06F 3/0632* (2013.01); *G06F 3/0652* (2013.01); *G06F 3/0659* (2013.01); *G06F 3/0673* (2013.01); *G06F 21/78* (2013.01)

(58) Field of Classification Search
CPC .............................. G06F 3/0632; G06F 3/0652
See application file for complete search history.

(56) References Cited

U.S. PATENT DOCUMENTS

| 6,757,783 | B2 | 6/2004 | Koh |
| 7,237,046 | B2 | 6/2007 | Paley |
| 7,957,532 | B2 | 6/2011 | Chen et al. |
| 8,266,378 | B1 * | 9/2012 | Jevans ............... G06F 12/1466 711/115 |
| 8,359,660 | B2 | 1/2013 | Lang |

(Continued)

FOREIGN PATENT DOCUMENTS

| CN | 102246455 | 11/2011 |
| EP | 2453346 | 5/2012 |

(Continued)

OTHER PUBLICATIONS

Advenica. "SecuriRAM." 2017. Advenica. (Year: 2017).*

(Continued)

*Primary Examiner* — Nathan Sadler
(74) *Attorney, Agent, or Firm* — Morgan, Lewis & Bockius LLP

(57) ABSTRACT

Highly secure portable storage device includes a physical input device, a memory and a controller, all of which reside within or on the device itself. The controller may determine whether the device is in an exclusive or nonexclusive mode, whether the device is in a privileged mode, a locked mode or a protected mode, and whether a request is made to self-transform to a renewed mode. When the request is made and the device is in the nonexclusive mode, the device self-transforms to the renewed mode without requiring communication with the host and without requiring access code verification. When the request is made and the device is in the exclusive mode, the device self-transforms to the renewed mode only when a privileged security access code is verified. Transforming to a renewed mode sets all access codes to null and sets a new encryption key. Other methods and implementations are described.

20 Claims, 5 Drawing Sheets

(56) References Cited

U.S. PATENT DOCUMENTS

| | | |
|---|---|---|
| 8,584,222 B2 | 11/2013 | Hofer et al. |
| 8,640,226 B2 | 1/2014 | Chaturvedi et al. |
| 8,756,390 B2 | 6/2014 | Chu et al. |
| 8,971,533 B2 | 3/2015 | Wall et al. |
| 9,043,613 B2 | 5/2015 | Shapiro |
| 9,081,911 B2 | 7/2015 | Powers |
| 9,177,153 B1 | 11/2015 | Perrig et al. |
| 9,268,961 B2 | 2/2016 | Okamoto |
| 9,342,713 B2 | 5/2016 | Ali et al. |
| 9,367,485 B2 | 6/2016 | Nakamura et al. |
| 9,396,359 B2 | 7/2016 | Griffes et al. |
| 9,449,157 B2 | 9/2016 | Chaturvedi et al. |
| 9,720,700 B1 | 8/2017 | Brown et al. |
| 10,142,304 B2 | 11/2018 | Secatch et al. |
| 10,387,333 B2 | 8/2019 | Chun et al. |
| 2002/0184485 A1 | 12/2002 | Dray et al. |
| 2003/0103288 A1* | 6/2003 | Suzuki ............... G11B 19/02 360/66 |
| 2005/0081071 A1* | 4/2005 | Huang ............... G06F 21/81 713/300 |
| 2007/0130434 A1 | 6/2007 | Chu et al. |
| 2007/0300031 A1* | 12/2007 | Jevans ............... G06F 21/60 711/166 |
| 2008/0215841 A1* | 9/2008 | Bolotin ............... G06F 1/266 711/164 |
| 2008/0250172 A1 | 10/2008 | Tanaka |
| 2009/0200371 A1 | 8/2009 | Kean |
| 2009/0327743 A1 | 12/2009 | Finlayson et al. |
| 2011/0258456 A1 | 10/2011 | Lyakhovitskiy |
| 2012/0079289 A1 | 3/2012 | Weng |
| 2012/0093318 A1 | 4/2012 | Obukhov |
| 2012/0331202 A1 | 12/2012 | Cohen et al. |
| 2013/0167226 A1 | 6/2013 | Lin |
| 2014/0245427 A1 | 8/2014 | Nagai |
| 2014/0310532 A1 | 10/2014 | Ali et al. |
| 2016/0103625 A1* | 4/2016 | Fujimoto ............ G06F 13/16 711/103 |
| 2017/0277916 A1 | 9/2017 | Natarajan et al. |

FOREIGN PATENT DOCUMENTS

| | | |
|---|---|---|
| EP | 2747333 | 6/2014 |
| EP | 2876574 | 5/2015 |
| EP | 2761804 B1 | 7/2019 |
| KR | 20040111472 | 12/2004 |
| WO | WO 94/13080 | 6/1994 |
| WO | WO 2005/050910 | 6/2005 |
| WO | WO 2007/023657 | 3/2007 |

OTHER PUBLICATIONS

Dhiman et al. "Secure Portable Storage Drive: Secure Information Storage." Oct. 2018. Springer. CNC 2018. pp. 308-316. (Year: 2018).*

"GPIB Hardware, Installation Guide and Specifications," retrieved from http://www.ni.com/pdf/manuals/370426r.pdf, National Instruments, Jun. 2015, 46 pages.

"NVM Express Management Interface," retrieved from https://nvmexpress.org/wp-content/uploads/NVM-Express-Management-Interface-1.1-Ratified.pdf, Apr. 29, 2019, Revision 1.1, 151 pages.

"PHY Interface for the PCI Express, SATA, USB 3.1, DisplayPort, and Converged IO Architectures," Intel Corporation, © 2007-2019, Version 5.2, 166 pages.

"Universal Serial Bus 3.1 Specification," Hewlett-Packard Company, Revision 1.0, Jul. 26, 2013, 631 pages.

DL3 Configurator and Encrypted External Hard Drive, retrieved from web on Dec. 21, 2016, 9 pages.

Remote Management Suite and Local Administrator, retrieved from web on Dec. 21, 2016, 4 pages.

ThinkPad USB 3.0 Secure Hard Drive User Guide, Aug. 2013, 36 pages.

UKLA, Version 3.4 User Manual, 2014, 48 pages.

User Manual DL3 Configurator v. 1.32.6 Windows Client, Feb. 2014, 14 pages.

* cited by examiner

US 10,656,854 B1

METHOD AND PORTABLE STORAGE DEVICE WITH INTERNAL CONTROLLER THAT CAN SELF-VERIFY THE DEVICE AND SELF-CONVERT THE DEVICE FROM CURRENT MODE TO RENEWED MODE WITHOUT COMMUNICATING WITH HOST

TECHNICAL FIELD

The present description relates in general to computer-based storage devices, and more particularly to, for example, without limitation, a portable storage device with an internal controller that can self-verify access codes and self-convert from a current mode to a renewed mode without communicating with a host and related methods.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
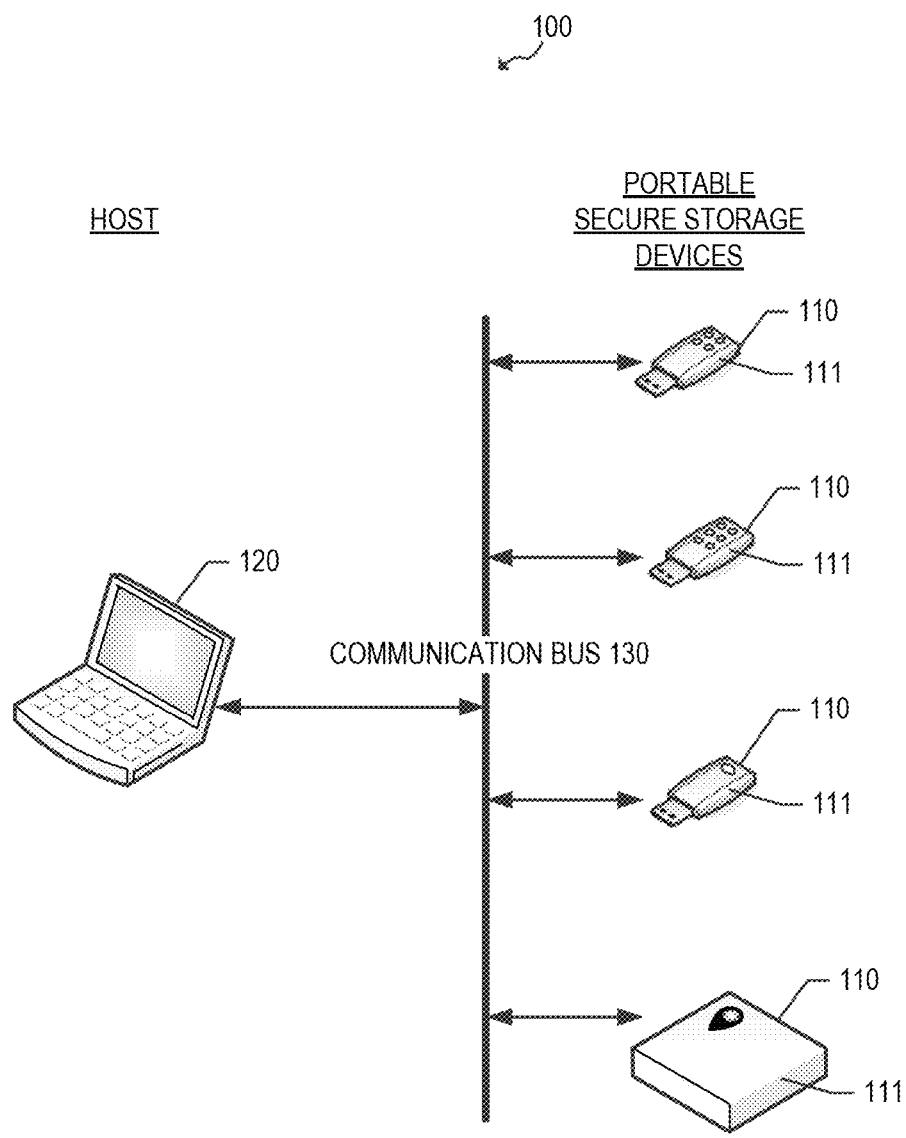
FIG. 1 illustrates an example of architecture for a host and portable secure storage devices.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In one or more advantageous implementations, a portable secure storage device provides a highly secure, flexible, host-free solution. A portable secure storage device may include a physical input device (e.g., a keypad), a mass storage memory and a controller.

In one or more aspects, the portable secure storage device does not require any host control, software or input for its normal operation or management (e.g., to lock or unlock the device, to authenticate the device, or to encrypt or decrypt data to or from a mass storage memory). The portable secure storage device can be self-authenticated as it uses its own input device and its own controller, all of which reside within or on the portable secure storage device itself. The portable secure storage device does not need a host for authentication. During a normal operational mode, the portable secure storage device, rather than a host, receives a security access code from a user via the device's own input device. The portable secure storage device can determine whether the security access code matches with an access code securely stored within the device, without using any input, instruction or data from a host. Thus, the portable secure storage device itself, rather than the host, can receive and process the security access code. The security access code is maintained only within the portable secure storage device and is not shared with the host. As there is no host involvement in the encryption key generation/management process or the authentication process, the risk of software hacking can be substantially circumvented.

Besides the normal operating mode (e.g., reading and writing data), there may be times when it is beneficial and advantageous to be able to place the portable secure storage device into a renewed mode. In this mode, the storage device does not contain any access code that can be used for verification to unlock and operate the device in its normal operating mode, and any data previously encrypted and stored in the device cannot be decrypted. Furthermore, all configuration profiles, which are not access codes, are changed to their default values. This renewed mode may be useful when the access codes are forgotten or misplaced or when it is desirable to erase all data, format and settings so that the device can be redeployed fresh.

One implementation may permit any user (e.g., a privileged user, a restricted user, or other users) to place the device into a renewed mode without any restriction. The disadvantage of this implementation is that any user (even an unauthorized user) can put the device into a renewed mode. Once in a renewed mode, that user can re-configure the device any way he or she desires. For example, if a device belongs to a company and if an unauthorized user places the device into a renewed mode, then he or she can re-configure and use the device in a manner that is against the company's computer security policy.

In one or more aspects, this disclosure provides new advantageous methods that can prevent unauthorized conversion of the device into a renewed mode. The subject disclosure provides two modes: an exclusive mode and a nonexclusive mode. These modes can be set or changed when a privileged security access code is verified. If the device is in a nonexclusive mode, then the device can be converted from a current mode to a renewed mode without restrictions. If, however, the device is in an exclusive mode, and if a privileged security access code is not verified, then the device is prevented from entering into a renewed mode even if a restricted security access code has been verified.

The subject technology addresses challenges arising in the realm of computer technology by providing a solution rooted in hardware and firmware, for example, by providing a portable secure storage device with an internal controller that can self-authenticate, self-determine whether a request for conversion has been made, self-determine the modes of the device, and self-convert the device to a renewed mode only when appropriate. Each of these operations can be carried out securely, efficiently and promptly without communicating with a host or using the host. By enabling the portable secure storage device to perform self-authentication, self-determination, and self-conversion in such a manner and not sharing the access codes, instructions or encryption key(s) with the host, the subject technology can greatly enhance security of the portable secure storage device. On the host side, no special software or driver is required, thereby improving the performance of the host by eliminating installation and execution overhead of such extra software.

FIG. 1 illustrates an example of architecture for a host and secure storage devices suitable for practicing one or more implementations of the disclosure. The architecture shown in FIG. 1 is for illustration purposes, and other architecture implementations and methods are within the scope of the disclosure. The architecture 100 includes a host 120 and portable secure storage devices 110 connected over a communication bus 130.

The host 120 is operable to connect to the portable secure storage devices 110. In some aspects of the present technology, the host 120 may be a computer with a general-purpose operating system. In other aspects of the present technology, the host 120 may be an embedded system. Multiple portable secure storage devices 110 can be connected to the host 120 over a common data terminal (e.g., the communication bus 130).

The host 120 can be, for example, a desktop computer, a personal computer (PC), a server, a mobile computer, a tablet computer (e.g., an e-book reader), a mobile device (e.g., a smartphone or personal digital assistant (PDA)), or any other type of devices or systems having appropriate processor, memory, and communications capabilities for connecting to the portable secure storage device(s) 110. The host 120 may include one or more computing devices. The host 120 may include an input device 216 and an output device 214. The host 120 may connect to the portable secure storage devices 110 for reading and writing images, sounds, videos, and other data.

A portable secure storage device 110 can be a storage device having appropriate processor, memory, and communications capabilities for storing secure data, serving as a secure data back-up, and/or transferring secure data. The secure data may be accessible by various computing devices including the host 120 over the communication bus 130. A portable secure storage device may be sometimes referred to as a portable storage device, a storage device, a device, a drive, a memory apparatus or an apparatus. For example, a portable secure storage device 110 may represent a portable hard disk drive, a portable solid-state drive, a flash memory key, an encased portable storage device, an encased portable secure storage device, a portable storage device, or another storage device.

The communication bus 130 can include or can be a part of, for example, any one or more of a universal serial bus (USB), IEEE 1394, Thunderbolt 3, Ethernet, serial advanced technology attachment (ATA), external serial ATA (eSATA) and/or any other type of communication bus, communication interface or communication port. A communication bus may be referred to as a communication channel, a communication medium, or vice versa. Further, the communication bus 130 can include, but is not limited to, any one or more of the following network topologies, including a bus network, a star network, a ring network, a mesh network, a star-bus network, tree or hierarchical network, or any other suitable type of network.

Figure 2:
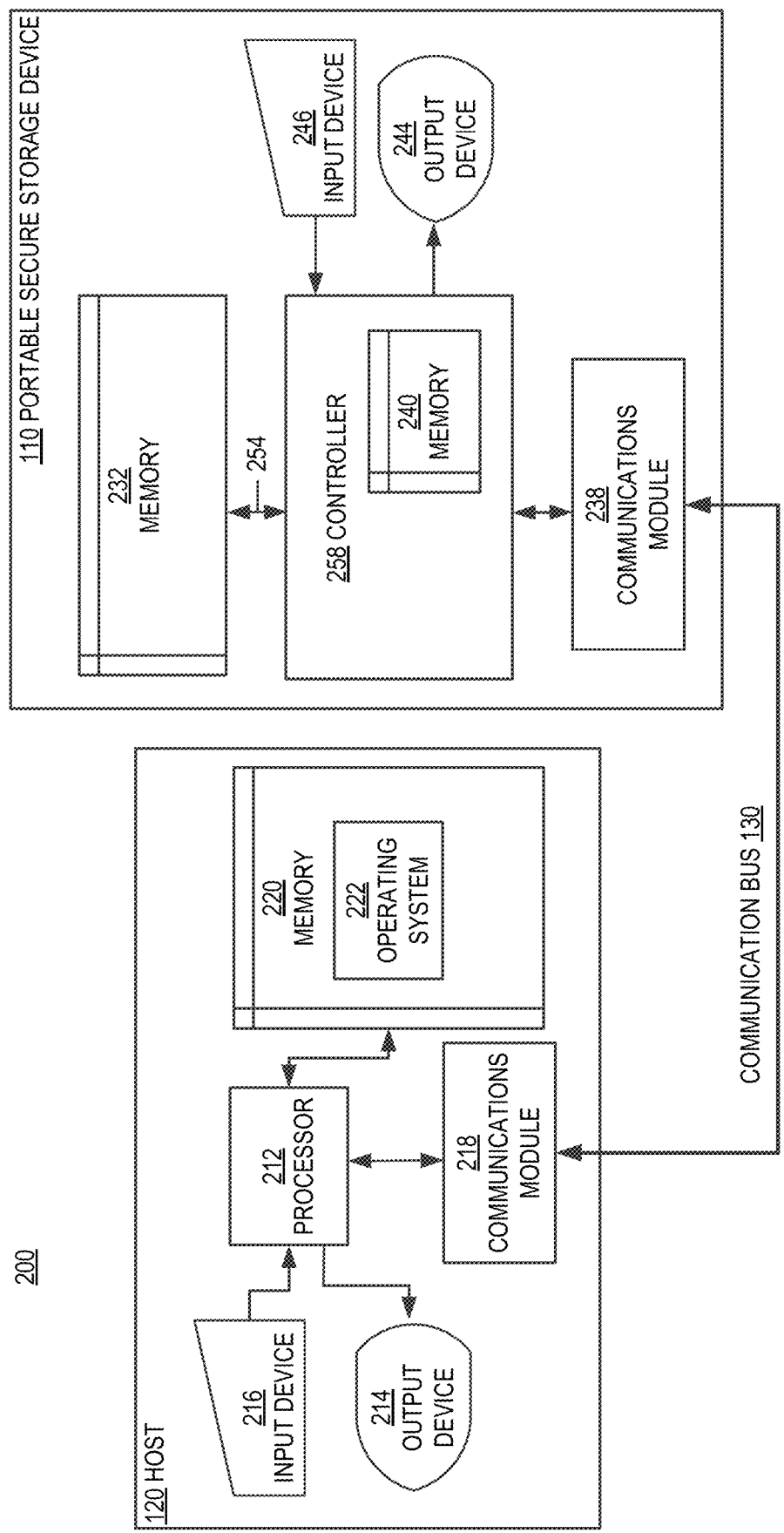
FIG. 2 is a block diagram illustrating an example of a host and a portable secure storage device.

FIG. 2 is a block diagram illustrating an example of a system including a portable secure storage device and a host. The system shown in FIG. 2 is for illustration purposes, and other systems and methods are within the scope of the disclosure. A system 200 may include a host 120 and a portable secure storage device 110 connected over a communication bus 130 via respective communications modules 218 and 238.

The communications modules 218 and 238 are configured to interface with the communication bus 130 to send and receive information, such as data, requests, responses, and commands between the host 120 and the portable secure storage device 110. The communications modules 218 and 238 can be, or can be a part of, for example, serial bus connectors or interfaces. The communications modules 218 and 238 may be referred to as, or may include, network interfaces or communication interfaces. In one or more examples, the communications module 218 and the communication bus 130 may be a part of a USB. In one example, the communications module 238 may be a part of a USB connector, and the communications module 218 and the communication bus 130 may be a part of a USB port(s), and the USB connector may be connected to the USB port. In one example, each of the communications modules 218 and 238 and the communication bus 130 is a wired communications module or bus. In another example, each of the communications modules 218 and 238 and the communication bus 130 may be a wireless communications module or bus. In one or more implementations, the communications modules 218 and 238 and the communication bus 130 may include, or be part of, a wireless interface(s), a wireless port(s), a wireless medium/media, and/or a wireless channel(s) to allow wireless communications between a host and a portable secure storage device(s)).

The host 120 includes a processor 212 and a memory 220. The memory 220 may be a read-and-write memory, a read-only memory, a volatile memory, a non-volatile memory, or a combination of some or all of the foregoing. The memory 220 of the host 120 includes an operating system 222, which may be a general-purpose operating system or an embedded operating system. The memory 220 may also include one or more applications, such as a configurator application (not shown), to communicate with the portable secure storage device 110. From the memory 220, the processor 212 may retrieve instructions to execute and data to process in order to facilitate some of the processes of the subject disclosure. The processor 212 can be a single processor, multiple processors, or a multi-core processor in different implementations.

The portable secure storage device 110 includes a memory 232 and a controller 258. The portable secure storage device 110 may further include a communications module 238, an input device 246, and an output device 244. The input device may be referred to as a physical input device, a physical key input device, or a key input device. The output device may be referred to as a physical output device.

In one or more implementations, the portable secure storage device 110 includes a casing (e.g., 111 as illustrated in FIG. 1) or a housing. The casing may be, for example, a metal-based casing (e.g., aluminum) or a hardened plastic material. The casing may be made of multiple parts. In one or more implementations, the memory 232 and the controller 258 are disposed within the casing.

In one aspect, the memory 232 is configured to store secure data (e.g., encrypted data). The memory 232 may be, or may include, a read-and-write memory, a read-only memory, a volatile memory, a non-volatile memory, registers, or a combination of some or all of the foregoing. In some aspects, the memory 232 is a non-volatile memory unit that stores and retains data even when the portable secure storage device 110 is powered off. The memory 232 may include one or more memories. The memory 232 may include a flash memory, a hard drive, a solid-state drive, or some combination thereof. In one or more implementations, the memory 232 is a mass storage device. For example, the memory 232 may store 2 gigabytes (GB) to 16 terabytes (TB) of user data or more. In one aspect, the memory 232 is the largest memory in the portable secure storage device 110. The memory 232 may be communicably coupled to the controller 258 via a bidirectional communication link 254. In one or more implementations, the link 254 is a high-speed serial advanced technology attachment (SATA) for point-to-point connection between the memory 232 and the controller 258.

The physical input device 246 enables a user to communicate information and select commands to the portable secure storage device 110. For example, the physical input device 246 may receive a security access code from a user (e.g., a privileged user or a restricted user) to facilitate unlocking of the portable secure storage device. The security access code may also facilitate authentication of the user. The physical input device 246 may receive other control input to control the operation of the portable secure storage device. For instance, the physical input device 246 may receive a control input from a user (e.g., generated by the user pressing a button or a sequence of buttons) to convert a portable secure storage device 110 from a current mode to a renewed mode. In one example, when a user presses a first sequence of buttons (e.g., a request followed by a valid privileged security access code) which places the device 110 into a privileged mode, the user can press a second sequence of buttons to request conversion of the portable secure storage device 110 from the privileged mode to a renewed mode.

The physical input device 246 may include any acoustic, speech, visual, touch, tactile and/or sensory input device, such as a keypad, a switch, a jumper, a pointing device, a dial, a sensor device (e.g., a biometric sensor, a finger sensor, biometric iris recognition sensor), or a touchscreen. A keypad may include alphanumeric keys or buttons. The keypad may also include keys or buttons with symbols (e.g., a key or button with a lock symbol, a key or button with an unlock symbol). In one or more implementations, the physical input device 246 is disposed on or at the casing (e.g., an outer surface of the casing) so that a user can access the physical input device. Having a physical input device on the portable secure storage device itself allows a user to securely access the device or prevent access to the device and to place the portable secure storage device 110 into a different mode without using an external system, such as a host computer or host software. The physical input device 246 is configured to receive an input provided by a user. In one or more implementations, the input includes one or more keypad entries, a switch setting, a jumper setting, a biometric-based entry, a touch gesture entry, or a combination thereof. To prevent accidental inputs, one or more components of physical input device 246 may be recessed or hidden under a cover.

The physical output device 244 may be disposed on or at the outer surface of the casing and configured to display an indication of the operation or status of the portable secure storage device 110. Such indication may be controlled by the controller 258. The output device 244 may enable, for example, the display or output of visual or audible signaling by the controller 258. The indication may include a signal indicating, for example, whether the portable secure storage device 110 is in an exclusive mode, a nonexclusive mode, a renewed mode, an operating mode, a privileged mode, a locked mode, an unlocked mode, a protected mode or another mode, and/or indicating a connection state to the host 120 or an operational state of the device 110. The output device 244 may include any visual, auditory, tactile, and/or sensory output device to allow a user to detect an indication of the operation of the portable secure storage device 110. For example, the output device 244 may include one or more multicolored light emitting diodes (LEDs) or LEDs with color tinted light guides. One or more implementations may include a device(s) that functions as both an input and output device, such as a touchscreen. An input device 246 may be a portion of an input and output device. An output device 244 may be a portion of an input and output device.

The communications module 238 of the portable secure storage device 110 is configured to connect the portable secure storage device 110 to the communication bus 130 external to the casing. The communications module 238 may include, or may be a part of a USB (e.g., USB-A, USB-B, USB-C, mini-USB, micro-USB or USB 3). These are examples, and the communications module 238 is not limited to these examples. The communications module 238 may be, for example, disposed partially within the casing and partially outside the portable secure storage device 110. In one or more examples, the communications module 238 is coupled to and protrudes from the casing.

In one or more implementations, the portable secure storage device 110 includes a battery(ies) (not shown) that may power the portable secure storage device 110 or a portion(s) thereof. In one example, the battery(ies) may power the controller 258 (or a portion(s) thereof), the physical input device 246, and/or the physical output device 244. The battery(ies) may be rechargeable, for example, by using bus or line power. In another implementation, the portable secure storage device 110 does not include a battery.

Still referring to FIG. 2, in one or more implementations, a controller 258 is coupled to the memory 232, the physical input device 246, the physical output device 244, and the communications module 238. The controller 258 may provide instructions to prevent or allow data transfer between the portable secure storage device 110 and an external system (e.g., the host 120).

In one example, a controller 258 is a single controller. In another example, a controller 258 includes multiple controllers (e.g., two controllers or more than two controllers). A controller may be sometimes referred to as a microcontroller, a multi-core controller, a controller module, a processor, a processor module, a microprocessor, a microprocessor module, or a portion(s) thereof or vice versa. A controller(s) within a controller 258 may be sometimes referred to as a microcontroller(s). A microcontroller may include one or more microcontrollers. When a controller 258 has multiple microcontrollers, each microcontroller may perform different functions, and a microcontroller may be implemented with a different level of security protection (e.g., a high, medium, or low security level). Such security level may be implemented in hardware, firmware, or a combination thereof.

A controller 258 may be a single integrated circuit (IC) chip (or a single die) or may include multiple IC chips. Multiple controllers within the controller 258 may be on a single chip. Multiple controllers within the controller 258 may be on separate chips.

In one or more implementations, a controller 258 is not a general purpose processing device. In one or more implementations, a controller 258 includes one or more application-specific digital signal processors or one or more application-specific integrated circuits. In one or more implementations, a controller 258 may include discrete hardware components or other suitable components that can perform the functions described herein. In one or more examples, a controller 258 (or one or more microcontrollers therein) is implemented in hardware and embedded firmware (without high-level software applications).

Microcontrollers within the controller 258 may be coupled, directly or indirectly, to each other, using communication links. A communication link may be a serial peripheral interface (SPI) bus for synchronous communication between the microcontrollers. A communication link may be a bidirectional communication link. A communication link may be an inter-integrated circuit (I²C) bus, where one microcontroller is implemented as a master node and another microcontroller is implemented as a slave node, in some examples. Other communication links may include, without limitation, a universal asynchronous receiver-transmitter (UART) interface, a general-purpose input/output (GPIO) interface, a peripheral component interconnect express (PCIe) interface, various SATA interfaces, an embedded multimedia controller (eMMC) interface, or a universal flash storage (UFS) interface. These are examples, and a communication link is not limited to these examples.

In one or more implementations, a controller 258 includes a local memory 240. The local memory 240 may be a read-and-write memory, a read-only memory, EEPROM, registers, a volatile memory, a non-volatile memory, or a combination of some or all of the foregoing. A local memory 240 may be a single memory or multiple memories. A memory may include one or more memories. When a controller 258 includes multiple microcontrollers and multiple memories, each microcontroller may have its associated local memory(ies). Such local memory(ies) may reside within its corresponding microcontroller. Such local memory(ies) may reside outside its corresponding microcontroller. A memory may be implemented with a different level of security protection. The security level may be implemented in hardware, firmware, or a combination thereof.

The local memory 240 or a memory(ies) therein may be configured to store firmware. The local memory 240 or a memory(ies) therein may be configured to store instructions and/or data, including parameters, flags, and/or information to control the operations of the controller 258 or the device 110. The local memory 240 or a memory(ies) therein may store instructions/data that the controller 258, a microcontroller(s) therein, and/or another component(s) may need at runtime. From the local memory 240 (or a memory(ies) therein), the controller 258, a microcontroller(s) within the controller 258, and/or another component(s) may retrieve instructions to execute and data to process in order to execute the processes of the subject disclosure.

In one or more implementations, all instructions/data (e.g., configuration profiles, other data, indications, keys, instructions, parameters, flags and information) stored in the portable secure storage device 110 (e.g., 240) is encrypted or securely stored. In one or more other implementations, some instructions/data (e.g., a portion or some of configuration profiles, other data, indications, keys, instructions, parameters, flags and/or information) stored in the portable secure storage device 110 (e.g., 240) is encrypted or securely stored. In one or more yet other implementations, some instructions/data (e.g., configuration profiles, other data, indications, keys, instructions, parameters, flags and/or information) stored in the portable secure storage device 110 (e.g., 240) is not encrypted. In one or more implementations, the user data stored in the memory 232 is encrypted or securely stored.

The controller 258 may provide instructions to prevent or allow data transfer between the portable secure storage device 110 and an external system (e.g., the host 120). The controller 258 may prevent the host 120 from accessing and configuring the portable secure storage device 110 when the secure storage device 110 is not in a configuration-ready mode.

In one or more implementations, configuration profiles of a portable secure storage device are settable or changeable by a privileged user. For example, a privileged user may change configuration profiles such as security information (e.g., access codes) or other configuration settings (e.g., auto-lock, lock-override, or other settings) associated with configuration of the portable secure storage device. This change can be made by the portable secure storage device, for example, using a physical input device (e.g., 246) and a controller (e.g., 258) of the portable secure storage device. In an alternative example, this change to the portable secure storage device may be made when the portable secure storage device is in a configuration-ready mode. Furthermore, the configuration profiles of the portable secure storage device may be changed by a configurator application of a host when a portable secure storage device is in a configuration-ready mode. The configurator application can also set or change a mode of the portable secure storage device (e.g., to a locked mode or to a privileged mode). In one aspect, when a portable secure storage device is in a configuration-ready mode, the device may be permitted to be recognized by a host when the device is connected to or plugged into the host.

Figure 3:
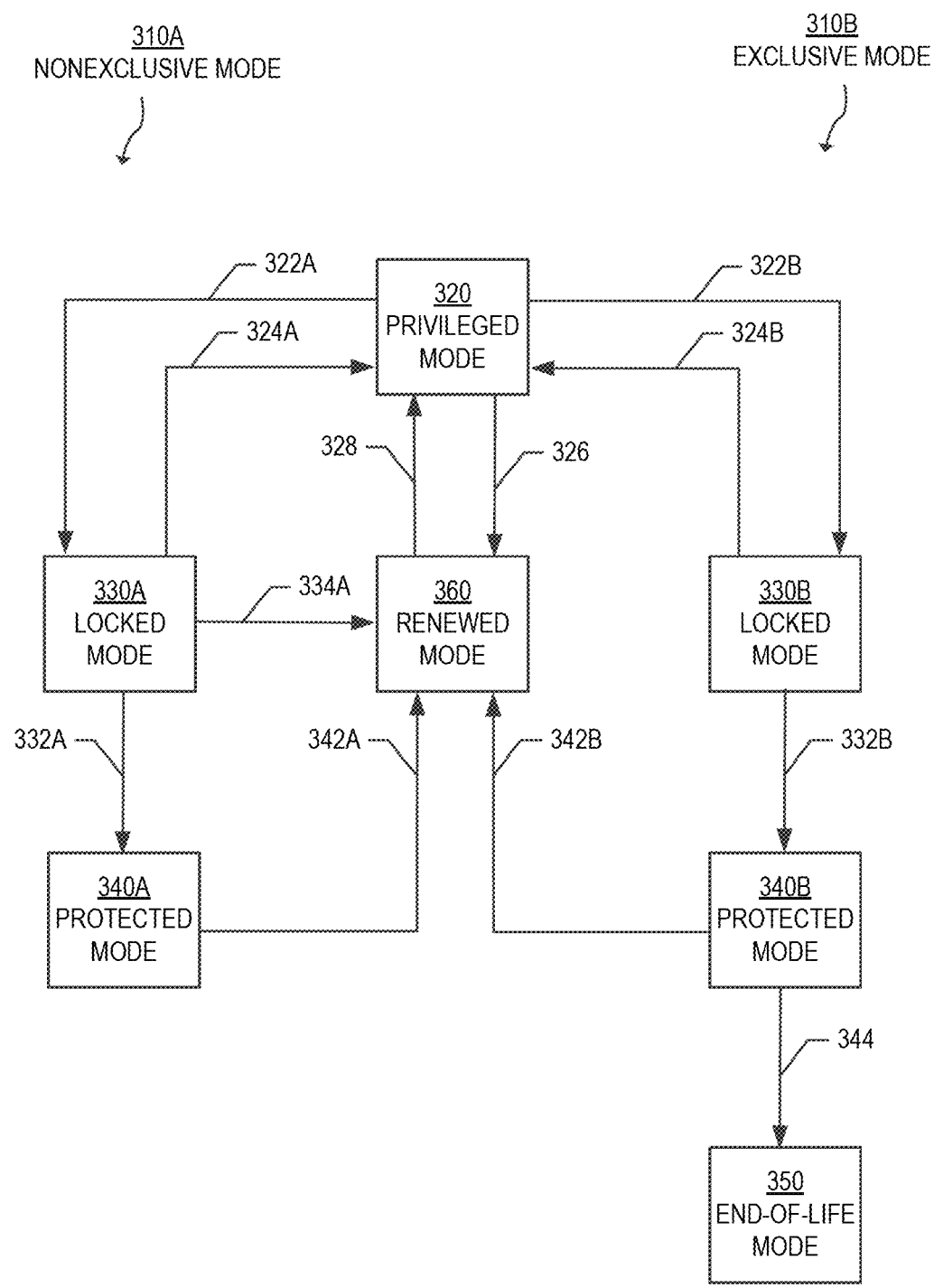
FIG. 3 illustrates an example of modes and operations of a portable secure storage device.

FIG. 3 illustrates an example of modes and operations of a portable secure storage device, such as a device 110 (e.g., a controller 258). The operations shown in FIG. 3 are for illustration purposes, and other operations are within the scope of the disclosure. Below descriptions are provided with reference to FIGS. 1, 2 and 3.

The example in FIG. 3 illustrates various modes of a portable secure storage device 110, including a nonexclusive mode 310A, an exclusive mode 310B, a privileged mode 320, a locked mode 330A, 330B, a protected mode 340A, 340B, a renewed mode 360, and an end-of-life mode 350. A device 110, however, is not limited to these modes, and the operations of the device 110 are not limited to the paths shown in FIG. 3.

Privileged Mode

In one example, a controller 258 may set a mode of a portable secure storage device 110 to a privileged mode (e.g., 320). This may occur, for example, (a) when a request is made to place the device 110 into the privileged mode (e.g., by a privileged user pressing one or more predetermined buttons for such a request on a keypad at an input device 246), and (b) when a privileged security access code (e.g., entered by a privileged user via an input device 246) is verified against a privileged access code stored in the portable secure storage device 110 (e.g., stored in the controller 258 or the memory 240).

For example, a device 110 may enter a privileged mode when a controller 258 receives a request, which is followed by receipt and verification of a correct privileged security access code. The request may be made, for example, by a privileged user pressing an unlock-symbol button, followed by a number-2 button on a keypad, at an input device 246. In one aspect, the controller 258 may self-convert the device 110 to a privileged mode without communicating with a host (e.g., 120). In one aspect, a self-conversion may occur without receiving or sending any input, instruction, command or data from or to the host. In one aspect, a self-conversion may occur while the device 110 is connected to the host. In one aspect, a self-conversion may occur while the host provides power to the device 110. In one aspect, a self-conversion may occur while the device 110 is disconnected from the host.

In a privileged mode, the device 110 can be converted from an exclusive mode 310B to a nonexclusive mode 310A and vice versa. In a privileged mode, the device 110 is convertible between the exclusive mode and the nonexclusive mode. In one aspect, when the device 110 is not in the privileged mode, the device 110 is prevented from converting between the exclusive mode and the nonexclusive mode. In a privileged mode, the stored privileged access code may be changed to a new valid privileged access code. For example, the controller 258 may accept a new privileged security access code (e.g., received at the input device 246) and store the new privileged security access code as the new valid privileged access code. In a privileged mode, some or all access codes (e.g., a privileged access code, a restricted access code, a recovery access code, a concealed access code, and/or a combination thereof) may be newly set or may be changed. In a privileged mode, all other configuration profiles of the device 110 that are changeable by a controller 258 (e.g., settings for auto-lock, lock-override, read-only, a minimum length of an access code, and implementing or enabling/disabling various other modes/features) may be set or changed.

A portable secure storage device may be in a privileged mode while it is in a nonexclusive mode or an exclusive mode. A device 110 may enter a privileged mode (a) from a locked mode (e.g., 330A) via a path 324A while the device 110 is in a nonexclusive mode or (b) from a locked mode (e.g., 330B) via a path 324B while the device 110 is in an exclusive mode. A device 110 may enter a privileged mode from a renewed mode (e.g., 360). In one aspect, when a device 110 is in a privileged mode, the device is not recognizable by a host (e.g., 120) even if the device is connected to or plugged into the host. In one aspect, when a device 110 is in a privileged mode, the device is not recognizable by the host even if the device is powered by the host.

Locked Mode

In one example, a controller 258 may lock a portable secure storage device 110 so that the device 110 is in a locked mode (e.g., 330A, 330B). A device 110 may enter into a locked mode when one or more of the following occur:
- the input device (e.g., 246) receives a request to lock the portable secure storage device. For example, a request can be made while in a privileged mode (see, e.g., path 322A or 322B) when a device is in a nonexclusive mode or in an exclusive mode. In addition or alternatively, a request can be made while a device 110 is in another mode (e.g., an operating mode such as a reading or writing mode) (not shown in FIG. 3). If the request is made while the device 110 is in an operating mode, then the device 110 converts to a locked mode after the device finishes its operation (e.g., reading or writing);
- power from a host (e.g., 120) to the portable secure storage device (e.g., 110) is interrupted;
- the portable secure storage device is disconnected or unplugged from the host;
- the portable secure storage device is electrically disengaged from the host, e.g., in response to a request;
- the portable secure storage device idles for a period of time; or
- the portable secure storage device is not connected to or not plugged into the host within a period of time after a security access code received at the input device is verified.

A portable secure storage device may be in a locked mode (e.g., 330A) while it is in a nonexclusive mode, or in a locked mode (e.g., 330B) while it is in an exclusive mode. In one aspect, when a portable secure storage device (e.g., 110) is in a locked mode, the portable secure storage device is not recognizable by a host (e.g., 120) even if the portable secure storage device is connected to or plugged into the host. In one aspect, when a device 110 is in a locked mode, the device is not recognizable by the host even if the device is powered by the host.

In one aspect, a conversion into a locked mode may occur without receiving or sending any input, instruction, command or data from or to the host. In one aspect, a conversion into a locked mode may occur while the device 110 is connected to the host. In one aspect, a conversion into a locked mode may occur while the host provides power to the device 110. In one aspect, a conversion into a locked mode may occur while the device 110 is disconnected from the host.

Protected Mode

In one example, a controller 258 may set a mode of a portable secure storage device 110 to a protected mode (e.g., 340A, 340B). In one aspect, the controller 258 may self-convert the device 110 to a protected mode without communicating with a host (e.g., 120). In one aspect, a self-conversion may occur without receiving or sending any input, instruction, command or data from or to the host. In one aspect, a self-conversion may occur while the device 110 is connected to the host. In one aspect, a self-conversion may occur while the host provides power to the device 110. In one aspect, a self-conversion may occur while the device 110 is disconnected from the host.

A controller 258 may set a mode to a protected mode when the number of unsuccessful security access codes (e.g., incorrect privileged security access codes or incorrect restricted security access codes) entered (e.g., into the input device) exceeds a threshold number.

When a controller 258 enables a protected mode (e.g., while the device 110 is in a privileged mode prior to entering into a protected mode), a controller 258 may store at least two representations (e.g., two different hash values) of a privileged access code at different locations of the controller 258 (e.g., different locations in a memory 240). For example, one representation may be stored at an EEPROM address 0x333, and another representation may be stored at an EEPROM address 0x555.

In one example, when the device 110 enters into a protected mode, the controller 258 may set all access codes stored in the device 110, except one access code (e.g., one of the at least two representations), to nullified access codes. In this regard, the one access code, which is not nullified (e.g., one of the at least two representations) may be usable to verify a privileged security access code to be received (e.g., received at the input device 246). In one aspect, further descriptions about nullified access codes are provided later with reference to a renewed mode.

In one example, when the device 110 enters into a protected mode, a controller 258 may set an encryption key of the device 110 (e.g., an encryption key existing prior to entering into the protected mode) to a new encryption key. In this regard, prior to entering into the protected mode, the device 110 may have encrypted data using the encryption key and may have stored the encrypted data in a memory (e.g., 232). In this example, after entering into the protected mode (and thereafter), such encrypted data cannot be decrypted any longer with the encryption key as it is replaced by the new encryption key when the device enters into the protected mode. In one aspect, the new encryption key is unusable to decrypt the encrypted data that has been stored in the memory (e.g., 232) prior to the device 110 entering into the protected mode. In one aspect, the new encryption key is unusable to decrypt the encrypted data that has been stored in the memory (e.g., 232) prior to the new encryption key is created or is set into the device 110.

In one example, when the device 110 enters into a protect mode, the controller 258 may set all configuration profiles of the device 110, excluding the nullified access codes, to predetermined values (e.g., default values).

A device 110 may enter into a protected mode (e.g., 340A) while the device 110 is in a nonexclusive mode. For example, a protected mode (e.g., 340A) is entered from a locked mode (e.g., 330A). A device 110 may enter into a protected mode (e.g., 340B) while the device 110 is in an exclusive mode. For example, a protected mode (e.g., 340B) is entered from a locked mode (e.g., 330B). In one aspect, when a device 110 is in a protected mode, the device is not recognizable by a host (e.g., 120) even if the device is connected to or plugged into the host. In one aspect, when a device 110 is in a protected mode, the device is not recognizable by the host even if the host provides power to the device.

End-of-Life Mode

In one example, a controller 258 may set a mode of a device 110 to an end-of-life mode (e.g., 350). In one aspect, the controller 258 may self-convert the device 110 to an end-of-life mode without communicating with a host (e.g., 120). When a device is in an exclusive mode, a controller 258 may change a protected mode (e.g., 340B) to an end-of-life mode (e.g., 350), when the number of unsuccessful privileged security access codes entered (e.g., via an input device 246) exceeds a threshold attempt number. When a device 110 enters an end-of-life mode, the device 110 is permanently disabled and cannot be redeployed again for use, and the device 110 is not revivable. Even if the device 110 is powered on or plugged into a host 120, the device 110 (e.g., controller 258) does not respond to any input entered at the device 110 or at the host 120. Any data stored in the device 110 is not recoverable. A device 110 that is in an end-of-life mode cannot change its mode to another mode.

In an end-of-life mode, the device 110 may contain (a) all nullified access codes, (b) a new encryption key, and (c) predetermined values for all configuration profiles (excluding the access codes). An end-of-life mode may be followed by a protected mode, which already has (a) all nullified access codes (except for one access code or one representation thereof), (b) a new encryption key, and (c) predetermined values for all configuration profiles (excluding the access codes). In this case, converting into an end-of-life mode may be carried out by nullifying the one access code or the one representation thereof (e.g., by the controller 258). However, in another aspect, converting into an end-of-life mode may be carried out by (a) setting all access codes into nullified access codes, (b) generating another new encryption key, and (c) setting all configuration profiles (excluding the access codes) to predetermined values.

In one aspect, when a device 110 is in an end-of-life mode, the device is not recognizable by a host (e.g., 120) even if the device is connected to or plugged into the host. In one aspect, when a device 110 is in an end-of-life mode, the device is not recognizable by the host even if the device is powered by the host.

Renewed Mode

In one example, a controller 258 may set a mode of a portable secure storage device 110 to a renewed mode (e.g., 360). In one aspect, the controller 258 may self-convert the device 110 to a renewed mode without communicating with a host (e.g., 120). In one aspect, a self-conversion may occur without receiving or sending any input, instruction, command or data from or to the host. In one aspect, a self-conversion may occur while the device 110 is connected to the host. In one aspect, a self-conversion may occur while the host provides power to the device 110. In one aspect, a self-conversion may occur while the device 110 is disconnected from the host.

In one aspect, in a renewed mode, a privileged access code stored in the controller 258 (e.g., 240) may be a nullified privileged access code. A nullified privileged access code is unusable to verify any privileged security access code or any security access code received (e.g., received at the input device 246) while the portable secure storage device contains the nullified privileged access code.

In one aspect, in a renewed mode, all access codes stored in the portable secure storage device (e.g., stored in the controller 258 or the memory 240) are nullified access codes. In one aspect, at least a portion of each of the nullified access codes is not representable by any input enterable at an input device (e.g., 246). For example, if the input device 246 is a keypad having only alphanumeric keys, at least a portion of a nullified access code may represent one or more characters, symbols or other items that are not alphanumeric; hence, no security access code entered via the alphanumeric keypad can match any nullified access code in the controller 258 (e.g., the memory 240).

In one aspect, none of the nullified access codes is usable to verify any security access code received (e.g., received at the input device 246) while the portable secure storage device contains the nullified access codes and does not contain any valid access code. In one aspect, none of the nullified access codes contains all zeros. In one aspect, nullified access codes are not entered by a user. In one aspect, none of the nullified access codes is a predetermined value. In one aspect, nullified access codes are not usable to unlock a storage device after the storage device is locked. In one aspect, a nullified access code (e.g., a privileged access code or a restricted access code) is not usable to facilitate unlocking the storage device after the storage device is locked. In one aspect, nullified access codes are not usable to operate the storage device during a normal operation (e.g., for an operating mode). A nullified recovery access code is not usable to launch a user-forced enrollment or to create a new recovery access code. In one aspect, all or a portion of a nullified access code is not enterable via an input device (e.g., 246).

In one aspect, all access codes include all of any privileged access code, any restricted access code, any recovery access code, and any concealed access code stored in the device 110 (e.g., stored in the controller 258 or the memory 240). In one aspect, an access code or a valid access code is a code stored in the device 110 (e.g., stored in the controller 258 or the memory 240) that can be used to verify a security access code entered (e.g., at an input device 246) to facilitate unlocking the device 110 (e.g., for reading or writing data), to facilitate placing the device 110 into a privileged mode, or to facilitate placing the device 110 into a mode in which configuration profiles of the device 110 may be set or changed.

In one aspect, in a renewed mode, the device 110 (e.g., the controller 258 or the memory 240) contains a new encryption key that is unusable for decrypting data that has been encrypted and stored in the memory (e.g., 232) before the new encryption key is created or is set into the device 110. For example, data may have been encrypted using an encryption key and stored in the memory (e.g., 232) prior to the device 110 being in the renewed mode. When the device 110 is in the renewed mode, the device 110 (e.g., the controller 258 or the memory 240) contains a new encryption key that is unusable for decrypting the data stored in the memory before the new encryption key is set into the device 110 (e.g., the controller 258 or the memory 240). In one aspect, the new encryption key is unusable for decrypting the data stored in the memory prior to the device 110 being in the renewed mode. In one aspect, the new encryption key is different from the encryption key (that has existed before the new encryption key is created). In one aspect, the new encryption is not entered by a user and is not provided by a host.

In one aspect, in a renewed mode, all configuration profiles of the device 110, excluding the access codes, are predetermined values (e.g., default values). In one aspect, predetermined values of the configuration profiles are not entered by a user.

In one example, converting the device 110 to a renewed mode may include setting the stored privileged access code to a nullified privileged access code, by a controller 258. The controller 258 may also set any stored restricted access code(s) into nullified restricted access code(s). If the device 110 contains any recovery access code(s) and any concealed access code(s), the controller 258 may also set any such stored recovery access code(s) and concealed access code(s) into nullified recovery access code(s) and nullified concealed access code(s).

The nullified access codes may include nullified privileged access code(s) and nullified restricted access code(s). The nullified access codes may also include nullified recovery access code(s) and nullified concealed access code(s).

In one example, converting the device 110 to a renewed mode may include setting, by a controller 258, an existing encryption key to a new encryption key. The new encryption key is unusable for decrypting data that has been encrypted and stored in the memory (e.g., 232) before the new encryption key is set into the device 110. In one example, for the device 110 to enter into a renewed mode, a controller 258 may set an existing encryption key to a new encryption key that is unusable for decrypting data that has been encrypted and stored in the memory (e.g., 232) prior to the device 110 being in the renewed mode.

In one example, converting the device 110 to a renewed mode may include setting, by a controller 258, all configuration profiles of the device 110, excluding the nullified access codes, to predetermined values (e.g., default values).

In one example, the controller 258 self-determines the current mode of the device 110.

In one aspect, if the current mode is a protected mode (e.g., 340A in a nonexclusive mode or 340B in an exclusive mode), then the device 110 (or the controller 258 or the memory 240) may already have (a) all nullified access codes (except for one access code or one representation thereof), (b) a new encryption key, and (c) predetermined values for all configuration profiles (excluding the access codes). In this case, converting into a renewed mode may be carried out simply by nullifying the one access code or the one representation thereof (e.g., by the controller 258). However, in another aspect, converting into a renewed mode may be carried out by performing all conversion activities, including (a) setting all access codes into nullified access codes, (b) generating another new encryption key, and (c) setting all configuration profiles (excluding the access codes) to predetermined values. These conversion activities may be carried out concurrently or sequentially (e.g., from (a) to (c), or in another order).

In one aspect, while a device 110 is in a nonexclusive mode (e.g., 310A), when a request is made to convert the device 110 from a current mode (e.g., a locked mode 330A, a protected mode 340A, or a privileged mode 320) to a renewed mode, a controller 258 may self-convert the device 110 from the current mode to the renewed mode. This self-conversion may occur (a) without the device 110 communicating with a host (e.g., 120), (b) without requiring the device 110 (or the controller 258) to make a determination of whether a privileged security access code is verified (against a privileged access code stored in the memory 240), and (c) without requiring the device 110 (or the controller 258) to make a determination of whether a restricted security access code is verified (against a restricted access code stored in the memory 240).

In one aspect, while a device 110 is in an exclusive mode (e.g., 310B), when a request is made to convert the device 110 from a current mode (e.g., a protected mode 340B, or a privileged mode 320) to a renewed mode, a controller 258 may self-convert the device 110 from the current mode to the renewed mode, only when a privileged security access code received (e.g., at an input device 246) has been verified or is verified (e.g., against the stored privileged access code). This self-conversion may occur without the device 110 communicating with a host (e.g., 120).

If a controller 258 determines that the current mode is a privileged mode (e.g., 320), then the verification of the privileged security access code has already occurred before the device entered the privileged mode (prior to the request being made to convert the device 110 to a renewed mode). Hence, a re-verification of the privileged security access code is not necessary. However, in one aspect, a controller 258 may verify the privileged security access code again after the request is made and before converting the device 110 into the renewed mode.

Consequently, in one aspect, if the current mode is a privileged mode, the controller 258 may verify the privileged security access code before the controller determines that the request (i.e., a request to convert the device to a renewed mode) is made, as such verification would have occurred prior to entering into the privileged mode. In another aspect, if the current mode is a privileged mode, the controller 258 may re-verify the privileged security access code after the controller determines that the request (i.e., a request to convert the device to a renewed mode) is made.

In one aspect, if the current mode is a protected mode 340B, then a controller 258 may verify the privileged security access code, after determining that the conversion request (i.e., a request to convert the device to a renewed mode) is made, but before converting the device 110 into the renewed mode.

In one example, a request (e.g., a request to convert the device 110 into a renewed mode) may be made by pressing one or more predetermined buttons at a keypad (e.g., at the input device) associated with the request. Depending on the current mode and depending on whether the device 110 is in a nonexclusive mode or an exclusive mode, such one or more predetermined buttons may be the same or different. For example, when the current mode is a locked mode 330A (in a nonexclusive mode), a protected mode 340A (in a nonexclusive mode), or a privileged mode 320 (for both nonexclusive and exclusive modes), such buttons may include a lock-symbol button, followed by an unlock-symbol button, followed by a number-2 button. In another example, when the current mode is a protected mode 340B (in an exclusive mode), such buttons may include an unlock-symbol button, followed by a number-0 button.

In one aspect, if the current mode is a protected mode 340B, then a privileged user may make a request to transform the device 110 to a renewed mode (e.g., by pressing one or more predetermined buttons) and then enter a correct privileged security access code (e.g., within a predetermined number of attempts). When the number of unsuccessful privileged security access codes entered (e.g., into the input device) exceeds a threshold number, the device 110 may enter into the end-of-life mode 350 instead of a renewed mode 360. For example, a controller 258 may first determine whether a request to convert the device 110 to a renewed mode is made. If so, the controller 258 may determine whether the privileged security access code entered matches the stored privileged access code. When it matches, the controller 258 may place the device 110 into the renewed mode.

In one aspect, when a controller 258 determines that a request is made to convert the device 110 from a current mode to a renewed mode while the device is in an exclusive mode (e.g., 310B), the controller 258 may self-convert the device 110 from the current mode to the renewed mode only when the privileged security access code has been verified or is verified. As discussed above, the verification may occur prior to determining that the request is made or after determining that the request is made.

In one aspect, when a device 110 is in a renewed mode, the device is not recognizable by a host (e.g., 120) even if the device is connected to or plugged into the host. In one aspect, when a device 110 is in a renewed mode, the device is not recognizable by the host even if the host provides power to the device.

As illustrated in FIG. 3, a device 110 may convert from a privileged mode (e.g., 320) to a locked mode (e.g., 330A, 330B) via its respective path (e.g., 322A, 322B). A device 110 may convert from a locked mode (e.g., 330A, 330B) to a protected mode (e.g., 340A, 340B) via its respective path (e.g., 332A, 332B). A device 110 may convert from a protected mode (e.g., 340B) to an end-of-life mode (e.g., 350) via its path (e.g., 344). A device 110 may convert to a renewed mode (e.g., 360) from a privileged mode (e.g., 320), a locked mode (e.g., 330A), a protected mode (e.g., 340A) or a protected mode (e.g., 340B) via its respective path (e.g., 326, 334A, 342A, 342B). A device 110 may convert to a privileged mode (e.g., 320) from a locked mode (e.g., 330A, 330B) or a renewed mode (e.g., 360) via its respective path (e.g., 324A, 324B, 328).

A device 110 may convert from a locked mode 330A to a renewed mode 360 via a path 334A, or via paths 332A and 342A. These conversions can be performed without entering or verifying a privileged security access code. In this regard, none of the paths 334A, 332A and 342A requires a privileged security access code to be entered (e.g., at an input device 246) and verified against a privileged access code stored (e.g., in a memory 240).

A device 110 may convert from a locked mode 330A to a renewed mode 360 via paths 324A and 326. This conversion requires a privileged security access code be entered and verified, for example, against a privileged access code stored internally, e.g., in a memory 240. In this regard, the path 324A requires an entry and verification of a privileged security access code.

A device 110 may convert from a locked mode 330B to a renewed mode 360 via paths 332B and 342B, or via paths 324B and 326. These conversions require a privileged security access code be entered and verified, for example, against a privileged access code stored internally, e.g., in a memory 240. In this regard, each of the paths 324B and 342B requires an entry and verification of a privileged security access code.

In one or more aspects, the particular modes and paths shown in FIG. 3, including the modes and paths for entering into a renewed mode and exiting from a renewed mode provide technical advantages as they may eliminate or minimize conflicts among the modes or operations of the device 110 and allow the device 110 to communicate and operate properly. Furthermore, in one or more aspects, the technical advantages include reducing a probability that the device 110 could become unstable, which may result in damaging the device permanently. In one or more aspects, making a conversion to a renewed mode from an operating mode (e.g., an unlocked mode for reading or writing) is less desirable as such conversion could potentially commence in the middle of an operation such as reading or writing data to a memory 232 and thus could damage the device permanently.

Other Modes and Features

In addition to the modes described above, a device 110 may operate in various other modes or implement, enable or disable other modes or features.

A device 110 may be implemented with a read only mode. When enabled (e.g., in a privileged mode), data stored in the memory (e.g., 232) cannot be modified.

A device 110 may be implemented with a lock-override mode or feature. When enabled (e.g., in a privileged mode), the device 110 may stay unlocked during a USB re-enumeration procedure. The lock override may be enabled during a reboot sequence, and using the device 110 as a boot drive. The device 110 may remain unlocked in the lock override state as long as the device 110 remains connected (or plugged) into a USB port of a host. When a USB connection is lost (e.g., the device 110 is unplugged form the USB port), the secure storage device 110 may become locked.

If a device 110 is implemented with a device format feature, then after the device 110 is placed into a renewed mode, the device may be unlocked and reformatted (e.g., reformat the memory 232) so that data files can be written into the memory 232.

A device 110 may be implemented with a concealed mode. In one aspect, when a concealed mode is enabled, an exclusive mode is disabled. Hence, only a nonexclusive mode is permitted when a concealed mode is enabled. In one aspect, when a concealed mode is disabled, the device 110 may use an exclusive mode or a nonexclusive mode. A controller 258 may be configured to determine whether an exclusive mode is enabled if a user attempts to enable a concealed mode, and the controller may provide a notification of conflict to an output device 244.

When the device 110 is in the nonexclusive mode, when the concealed mode is enabled, and when a concealed security access code inputted at an input device (e.g., 246) is verified (e.g., against a concealed access code stored in the device 110), the controller 258 is configured to set an encryption key in the device 110 into a new encryption key.

The new encryption key is unusable for decrypting data encrypted and stored in the memory (e.g., 232) before the new encryption key is set into the device 110 (e.g., 240). If the device 110 thereafter enters into a protected mode or a renewed mode, a controller 258 may retain the new encryption key or may generate yet another new encryption key. Such another new encryption key is unusable for decrypting data encrypted and stored in the memory (e.g., 232) before such another new encryption key is created or is set into the device 110.

When the device 110 is in the nonexclusive mode, when the concealed mode is enabled, and when a concealed security access code inputted at an input device (e.g., 246) is verified, the controller 258 is configured to store the concealed security access code into the device 110 (e.g., the controller 258 or the memory 240) as a new privileged access code. This new privileged access code is valid and is not null. The new privileged access code becomes usable to verify another privileged security access code that may be entered after the new privileged access code is stored.

As described above, when a concealed mode is enabled, a user can input a concealed security access code into the device 110. This concealed security access code replaces the existing privileged access code stored in the device 110. Thus, this concealed security access code becomes a new privileged access code, which is then stored in the device 110 (e.g., a memory 240). Consequently, in one or more aspects, a concealed mode could be used to defeat the purpose of having an exclusive mode because a user who has a concealed security access code could bypass the security measures of an exclusive mode (as the user could store his/her concealed security access code as a new privileged access code) and place a device 110 into a renewed mode. As such, in one or more aspects, when a device 110 is in an exclusive mode, disabling a concealed mode provides a technical advantage that can prevent unauthorized conversion of the device into a renewed mode.

A device 110 may be implemented with an auto-lock mode or feature. When enabled (e.g., in a privileged mode), a controller 258 can set a predefined period of time of inactivity that causes the device 110 to lock. The device 110, however, does not lock when data is being written into the memory 232.

A device 110 may be implemented with a capability to switch the device 110 from a fixed disk to a removable disk and vice versa.

A device 110 may be implemented to permit a user-forced enrollment mode. In this mode, the device 110 may already have a privileged access code stored and require a restricted user to set up a new restricted access code to access the device 110. When the user-forced enrollment is activated, the output device 244 may provide one or more visual indications indicating that anew restricted access code needs to be programmed to gain access to the device 110.

A device 110 may enter into an operating mode (e.g., reading or writing data into a memory 232). When (a) a request is made to enter into an operating mode (e.g., an unlocked mode for reading or writing), (b) a privileged security access code or a restricted security access code is verified, and (c) the device 110 is connected to a host (e.g., 120), the device 110 (e.g., a controller 258) may perform an enumeration process with the host. For example, a controller 258 may transmit enumeration information of the device 110 via a communications module 238 and a communication bus 130. In one aspect, after the enumeration process is completed, the host 120 and the device 110 may be ready to exchange data (e.g., user data). In an operating mode, the controller 258 may (a) encrypt data received from the host 120 and write the encrypted data to a memory 232 and (b) decrypt data read from the memory 232 and provide the decrypted data to the host 120.

Access Codes

A device 110 (or the controller 258 or the memory 240) may store one or more access codes. When a security access code received (e.g., via an input device 246) is verified against a stored access code, a controller 258 may permit access to the device 110.

One type of access code may be a privileged access code. When a privileged security access code received (e.g., received at an input device 246) is verified against a stored privileged access code, the device 110 may be placed into a mode such as a privileged mode or an operating mode. In a privileged mode, a controller 258 may be permitted to set or change the configuration profiles of the device 110, for example, implementing, enabling or disabling various modes or features described herein or changing the stored access codes.

Another type of access code is a restricted security access code. When a restricted security access code received (e.g., received at an input device 246) is verified against a stored restricted access code, the device 110 may be placed into a mode such as an operating mode. A verified restricted security access code does not place the device 110 into a privileged mode. Thus, a verified restricted security access code has a less number of privileges than a verified privileged security access code.

Another type of access code may be a recovery access code. A device 110 may permit a recovery security access code to be received (e.g., at an input device 246) and stored as a recovery access code in the device 110 (e.g., 240). There may be multiple recovery access codes. After storing the recovery access code, when a next recovery security access code is received and verified against the stored recovery access code, a controller 258 may launch a user-forced enrollment. The recovery security access code is not an actual access code that is used to unlock the device 110 for an operating mode, but rather is used to place the device 110 into a state of user-forced enrollment where a new restricted access code may be created and stored. In another aspect, a recovery access code may be used to create and store a new privileged access code. Thus, a recovery access code is useful when a restricted access code and/or a privileged access code are forgotten, and it is necessary to be able to access any data stored in the memory (e.g., 232).

For example, after a recovery security access code received is verified against a stored recovery access code, a controller 258 permits a new restricted security access code to be received (e.g., via an input device 246) and stores the new restricted security access code as a new restricted access code. In another example, after a recovery security access code entered is verified against a stored recovery access code, a controller 258 permits a new privileged security access code to be received (e.g., via an input device 246) and stores the new privileged security access code as a new privileged access code.

Yet another type of access code may be a concealed access code. When a concealed mode is enabled, a concealed security access code received at an input device may be verified against a concealed access code stored in the device 110. After the verification, the verified concealed security access code or the stored concealed access code may be stored as a new privileged access code.

Converting a device 110 into a renewed mode may nullify all existing access codes stored in the device 110. Prior to entering into a renewed mode, if some access codes are already nullified, then a controller 258 may retain such nullified access codes and nullify only the other access codes. Alternatively, entering into a renewed mode may cause all access codes (whether already nullified or not) to be nullified.

A device 110 may enter into or exit from the various modes using one or more methods described herein. These methods are provided for illustration purposes, and other methods are within the scope of the disclosure.

Figure 4:
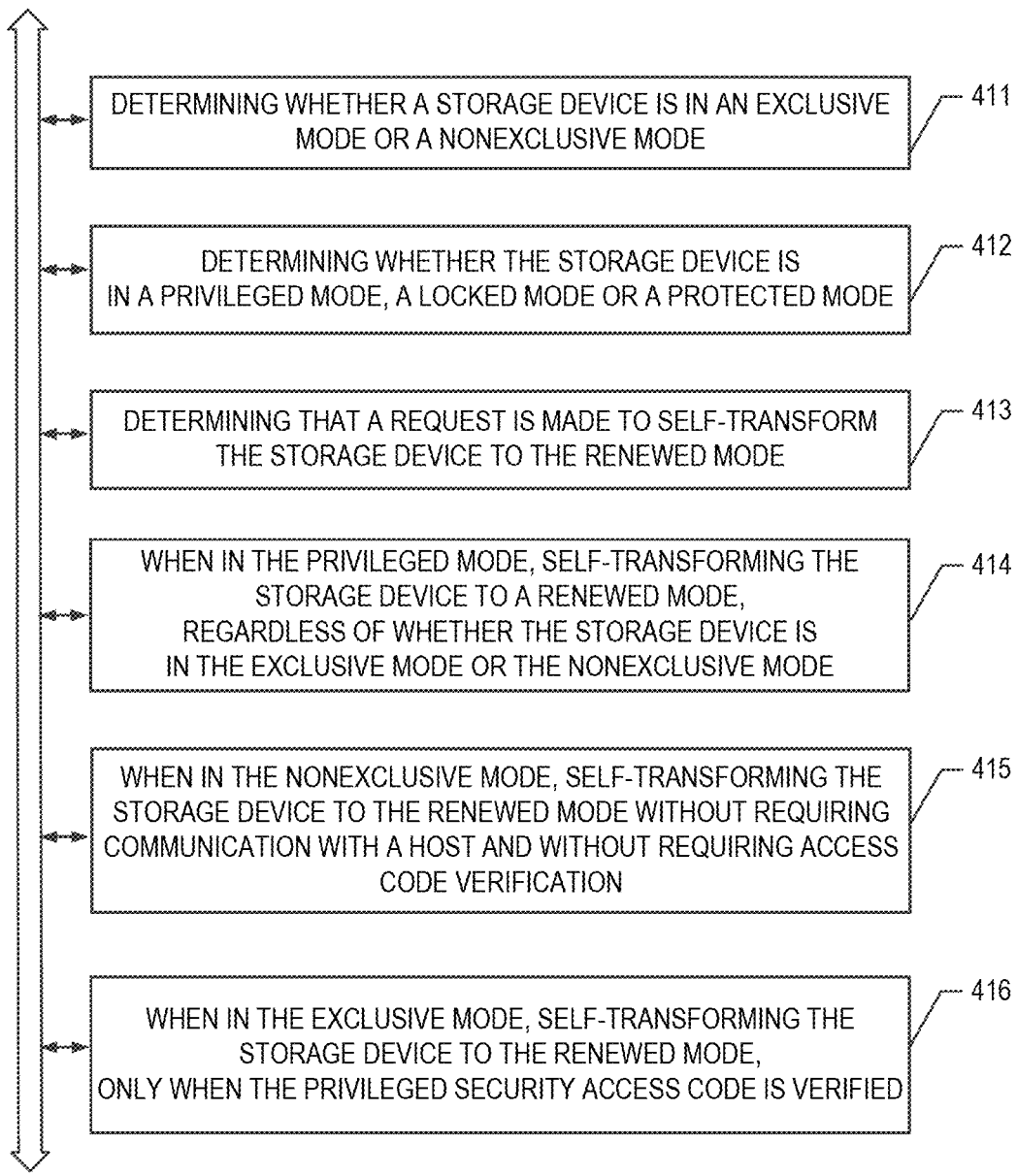
FIG. 4 illustrates an example of operations performed by a portable secure storage device.

FIG. 4 illustrates an example of operations performed by a portable secure storage device, such as a storage device 110. The operations shown in FIG. 4 are for illustration purposes, and other operations are within the scope of the disclosure. Below descriptions are provided while referring to FIGS. 1 through 4.

A memory (e.g., 232) of a storage device (e.g., 110) may be disposed within a housing (e.g., 111) and is configured to store data (e.g., encrypted user data). An input device (e.g., 246) may be disposed at the housing and is configured to receive a privileged security access code and is configured to receive a restricted security access code.

The operations described in FIG. 4 may be performed by a controller of a storage device 110 (e.g., the controller 258, or one or more components within the controller 258). In one aspect, the controller may perform the operations without communicating with a host (e.g., 120). In one aspect, the controller 258 or its components may perform the instructions stored in the memory 240. In one aspect, the host is separate and distinct from the storage device. In one aspect, the storage device may be connected to the host and may receive power from the host but does not send or receive any instructions, commands or data to or from the host in connection with the operations described below with reference to blocks 411 through 416 of FIG. 4. In one aspect, the storage device is not recognizable by the host even if connected to the host for these operations. In one example, the storage device is disconnected from the host during some or all of these operations.

As illustrated in block 411 of FIG. 4, a controller (e.g., 258 or one or more components therein) may be configured to determine whether a storage device (e.g., 110) is in an exclusive mode (e.g., 310B) or a nonexclusive mode (e.g., 310A). As illustrated in block 412, the controller may determine whether the storage device is in a privileged mode (e.g., 320), a locked mode (e.g., 330A or 330B) or a protected mode (e.g., 340A or 340B). As illustrated in block 413, the controller may determine that a request is made to self-transform the storage device to a renewed mode (e.g., 360). In one example, the blocks 411, 412 and 413 may be performed sequentially from block 411 to block 413, in reverse order, or in another order. In another example, some or all of these blocks may be performed concurrently.

As illustrated in block 414, when the request is made and when the storage device is in the privileged mode (e.g., 320), the controller may self-transform the storage device to the renewed mode, regardless of whether the storage device is in the exclusive mode or the nonexclusive mode. This self-transformation may be performed in response to the request (e.g., received via an input device 246).

As illustrated in block 415, when the request is made and when the storage device is in the nonexclusive mode (e.g., 310A), the controller may self-transform the storage device to the renewed mode (e.g., 360). This self-transformation may be performed in response to the request. In one aspect, this self-transformation is performed when the storage device is in the locked mode (e.g., 330A) or the protected mode (e.g., 340A). This self-transformation may be performed without requiring communication with the host, without requiring a determination of whether the privileged security access code is verified, and without requiring a determination of whether the restricted security access code is verified.

As illustrated in block 416, when the request is made and when the storage device is in the exclusive mode (e.g., 310B), the controller may self-transform the storage device to the renewed mode (e.g., 360), only when the privileged security access code is verified. In one aspect, this self-transformation is be performed when the storage device is in the protected mode (e.g., 340B).

In one aspect, when the storage device is transformed into the renewed mode, all access codes in the storage device are nullified access codes, none of which is usable to verify any security access code received at the input device (e.g., 246) while the storage device contains the nullified access codes.

In one aspect, when data is encrypted using an encryption key and stored in the memory (e.g., 232) prior to the storage device being transformed into the renewed mode, and when the storage device is thereafter transformed into the renewed mode, the storage device contains a new encryption key that is unusable for decrypting the data stored in the memory (e.g., 232) prior to the storage device being transformed into the renewed mode.

In one aspect, when the storage device is in the privileged mode, the privileged security access code is verified, and the storage device is convertible between the exclusive mode and the nonexclusive mode.

In one aspect, when the storage device is in the locked mode, the storage device is not recognizable by the host even if the storage device is connected to the host.

In one aspect, when the storage device is in the protected mode, the storage device contains the new encryption key or another new encryption key, wherein such another new encryption key is unusable for decrypting data encrypted and stored in the memory prior to the storage device being in the protected mode.

In one aspect, the restricted security access code is different from the privileged security access code.

In one aspect, the restricted security access code is unusable to convert the storage device from the exclusive mode to the nonexclusive mode and from the nonexclusive mode to the exclusive mode.

In one aspect, when the storage device is in the exclusive mode, and when the privileged security access code is not verified, the controller is prevented from transforming the storage device to the renewed mode, even if the restricted security access code is verified.

Figure 5:
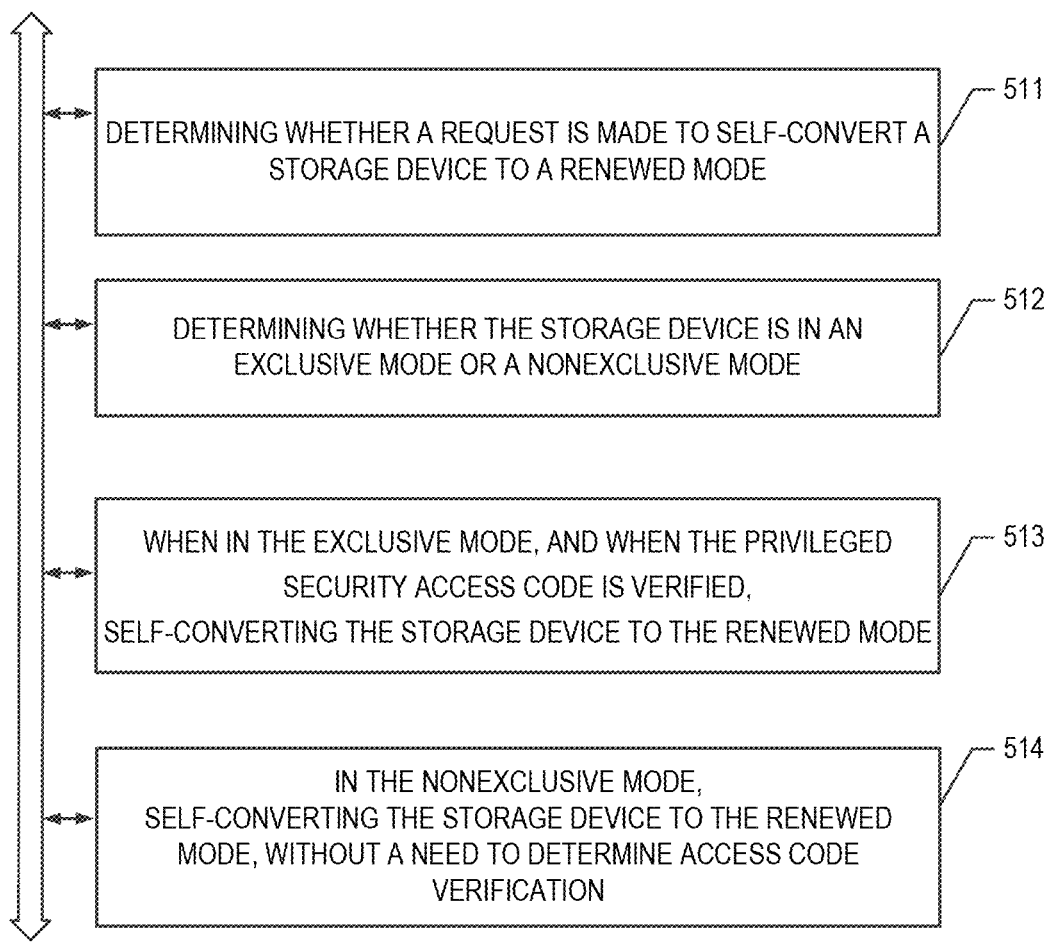
FIG. 5 illustrates another example of operations performed by a portable secure storage device.

FIG. 5 illustrates an example of operations performed by a storage device, such as a storage device 110. The operations shown in FIG. 5 are for illustration purposes, and other operations are within the scope of the disclosure. Below descriptions are provided while referring to FIGS. 1 through 5.

A storage device (e.g., 110) may include a casing. A memory (e.g., 230) may be disposed within the casing and configured to store encrypted data. An input device (e.g., 246) may be disposed at the casing, configured to receive a privileged security access code, and configured to receive a restricted security access code. An output device (e.g., 244) may be disposed at the casing and configured to provide an output.

The operations described in FIG. 5 may be performed by a controller of a storage device 110 (e.g., the controller 258, or one or more components within the controller 258). In one aspect, the controller 258 or its components may perform the instructions stored in the memory 240. In one aspect, the controller may perform the operations described in blocks 511 through 514 of FIG. 5 without communicating with a host (e.g., 120). In one aspect, the host is separate and distinct from the storage device. In one example, the storage device may be connected to the host and may receive power from the host but does not send or receive any instructions, commands or data to or from the host in connection with the operations described below with reference to blocks 511 through 514 of FIG. 5. In one aspect, the storage device is not recognizable by the host even if connected to the host for these operations. In one example, the storage device is disconnected from the host during some or all of these operations.

A controller (e.g., the controller 258, or one or more components within the controller 258) may be disposed within the casing and coupled to the input device. The controller is may be configured to cause: (a) unlocking the storage device based on the privileged security access code or the restricted security access code; and (b) locking the storage device based on a request, a status, an occurrence of a first event, or an omission of a second event.

The controller may be configured to cause (a) storing a privileged access code in the controller and (b) storing a restricted access code in the controller. The controller may receive a first input via the input device (e.g., 246). In one aspect, the operations described in this paragraph are performed by the controller without communicating with the host.

As illustrated in block 511 of FIG. 5, the controller may be configured to cause determining whether a request is made to self-convert the storage device to a renewed mode (e.g., 360). The determination may be made by the controller by itself in response to the first input. The self-conversion may be carried out from a current mode to the renewed mode.

In one advantage example, the current mode is a privileged mode. In another advantage example, the current mode is a locked mode. In another advantage example, the current mode is a protected mode.

As illustrated in block 512, the controller may be configured to cause determining whether the storage device is in an exclusive mode (e.g., 310B) or a nonexclusive mode (e.g., 310A). In one aspect, the blocks 511 and 512 may be performed sequentially from the block 511 to the block 512 or in reverse order. In another aspect, these blocks may be performed concurrently.

As illustrated in block 513, when the storage device is in the exclusive mode, and when the privileged security access code is verified, the controller may be configured to cause self-converting the storage device to the renewed mode. The privileged security access code may have been received at the input device (e.g., 246) and may be verified against the stored privileged access code. The self-conversion may be carried out when the request is made. The self-conversion may be carried out from the current mode to the renewed mode. This self-conversion may be performed without communicating with the host.

As illustrated in block 514, when the storage device is in the nonexclusive mode, the controller may be configured to cause self-converting the storage device to the renewed mode. This self-conversion may be carried out when the request is made. This self-conversion may be carried out from the current mode to the renewed mode. In addition, this self-conversion may be performed without communicating with the host, without requiring a determination of whether the privileged security access code is verified, and without requiring a determination of whether the restricted security access code is verified.

In one aspect, when the storage device is in the renewed mode, the stored privileged access code is a nullified privileged access code. The nullified privileged access code is unusable to verify any privileged security access code or any security access code, which is received at the input device while the storage device contains the nullified privileged access code.

In one aspect, when data is encrypted using an encryption key and stored in the memory (e.g., 232) prior to the storage device being in the renewed mode, and when the storage device is thereafter in the renewed mode, the storage device contains a new encryption key. The new encryption key is unusable for decrypting the data stored in the memory before the new encryption key is set into the storage device.

In one aspect, the restricted security access code is different from the privileged security access code. In one aspect, the restricted security access code is usable to change a less number of configuration profiles of the storage device than the privileged security access code. In one aspect, the restricted security access code is unusable to convert the storage device from the exclusive mode to the nonexclusive mode and from the nonexclusive mode to the exclusive mode.

In one aspect, when the storage device is in the exclusive mode, and when the privileged security access code is not verified, the controller is prevented from converting the storage device from the current mode to the renewed mode even if the restricted security access code is verified.

In one aspect, when the storage device is in the renewed mode, all access codes in the storage device are nullified access codes, none of which is usable to verify any security access code received at the input device while the portable storage device contains the nullified access codes.

In one aspect, when the storage device is in the renewed mode with the nullified privileged access code and the new encryption key, a controller (e.g., 258) may accept a request to create a new valid privileged access code. The request may be made, for example, by pressing one or more predetermined buttons associated with the request at an input device (e.g., 246). When the controller accepts the request, a new privileged security access code is enterable (e.g., at an input device 246). In the renew mode, the controller (e.g., 258) is configured to enable receiving and processing a new privileged security access code entered at an input device (e.g., 246) and storing the new privileged security access code as a new privileged access code in a memory (e.g., 240). In one aspect, this process of storing a new privileged access code is performed without verifying or authenticating the new privileged security access code or its source. This new privileged access code is valid and is not null. When the controller contains the new privileged access code, the storage device is no longer in the renewed mode. In one aspect, the foregoing conversion may occur via a path (e.g., 328) from the renewed mode (e.g., 360) to a privileged mode (e.g., 320). When the controller contains the new privileged access code, the storage device may be considered to be in a privileged mode (e.g., 320). The new privileged access code may be used to verify another privileged security access code to be entered at an input device. This may be, for example, to unlock the storage device or to enter into another mode.

In one aspect, after the storage device exits the renewed mode, when a second privileged security access code is inputted at the input device (e.g., 246) and verified against the new privileged access code, the storage device (e.g., controller 258) may facilitate formatting a memory (e.g., 232).

In one aspect, after the storage device exits the renewed mode, when a second privileged security access code is inputted at the input device (e.g., 246) and verified against the new privileged access code, the storage device may enable (a) receiving and processing a new restricted security access code entered at the input device (e.g., 246) and (b) storing the new restricted security access code as a new restricted access code. This new restricted access code is valid and is not null. The new restricted access code may be used to verify another restricted security access code to be entered at an input device. This may be, for example, to unlock the storage device and enter into an operating mode.

In one or more implementations, a storage device 110 may be connected to or plugged into a host 120 (e.g., via a USB port or other methods) at various times. For example, a storage device 110 may be connected to or plugged into a host 120 prior to any of the operations shown in FIGS. 4 and 5. However, merely plugging in the device 110 to the host 120 does not allow the device 110 to be recognized by the host 120. Even though the device 110 does not require any special software or special driver on the host 120, the device 110 needs to perform certain operations by itself prior to the device 110 becomes recognizable by the host 120. This improves security of the device 110. The storage device 110 is not recognizable or detectable by the host 120 until after a security access code (e.g., received at an input device 246) is verified by a controller 258. In one aspect, the device 110 is not recognizable or detectable by the host 120 until after an enumeration process between the device 110 and the host 120 is initiated. In one or more aspects, an enumeration process does not commence until after a security access code is verified by a controller (e.g., 258) of the storage device. In one aspect, the device 110 is not recognizable or detectable by the host 120 until after an enumeration process between the device 110 and the host 120 is completed. In one aspect, the device 110 is not recognizable or detectable by the host 120 until after an encryption key is retrieved (e.g., from the memory 240) and is made available for encrypting user data. When the device 110 is unlocked (e.g., as a result of, in response to or after one or more operations described in this paragraph), the device is recognizable by the host 120.

In one or more aspects, enumeration may be a process of having a device attached or connected to or plugged into the host 120, such as the device 110, detected and identified. In one or more implementations, enumeration information may include a product identifier, a vendor identifier, a device descriptor, a configuration description, and an interface descriptor. In one example, enumeration information includes USB enumeration information, which may include, for example, a USB product ID, USB vendor ID, USB device type, USB device class, USB device speed, USB device descriptor, etc. In one or more implementations, enumeration information is not settable or changeable by any user (e.g., any privileged user or any restricted user). In one or more implementations, enumeration information is permanent information describing a device.

After an enumeration process with the host 120 is completed, a component of the controller 258 may notify the completion to other components within the controller 258 and/or provide a completion signal to an output device 244. In one aspect, after the enumeration process is completed, the host 120 and the device 110 may be ready to exchange data (e.g., user data).

In one or more implementations, when an encryption key is stored in a storage device 110 (e.g., a controller 258, its component, or a memory 240), the encryption key may be stored in various forms (e.g., a hash value, an encrypted value, a representation, or an exact copy thereof). In one example, an encryption key may refer to one or more encryption keys. In one example, when an encryption key is set to, or replaced by, a new encryption key, and if a storage device 110 contains more than one encryption key, then all encryption keys in the storage device are set to, or replaced by new encryption keys. In one example, if a storage device 110 is described as containing a new encryption key, and the storage device contains multiple encryption keys, then all encryption keys in the storage device are new encryption keys. In one aspect, an encryption key may refer to a form of encryption key (e.g., a hash value, an encrypted value, a representation, or an exact copy thereof).

In one or more implementations, when an access code (e.g., a privileged access code, a restricted access code, a recovery access code, or a concealed access code) is stored in the storage device 110 (e.g., a controller 258 or a memory 240), the access code may be stored in various forms (e.g., a hash value, an encrypted value, a representation, or an exact copy thereof). In one example, an access code may refer to one or more access codes. In one example, a nullified access code may refer to one or more nullified access codes. In one example, when a storage device contains a nullified access code, all access codes may be nullified access codes.

In one aspect, data stored in the memory 232 is user data. In one aspect, user data does not control any operation of a storage device 110. In one aspect, user data does not instruct any controller (e.g., 258) of the storage device 110 to perform a function. In one aspect, user data does not include any access codes, any configuration profiles, settings, data or parameters, or any encryption key of the storage device. In one aspect, user data does not include any data inputted at an input device (e.g., 246) of the storage device 110. In one aspect, user data does not include any output produced at an output device (e.g., 244) of the storage device 110. In one aspect, user data is received from a host 120. In one aspect, user data is transferred to the memory 232 and retained in the memory 232 when power is off. In one aspect, user data is not retained in the controller 258 when power is off.

Additional descriptions and advantages are provided below with respect to an exclusive mode, a nonexclusive modes and a renewed mode.

In one aspect, an exclusive mode is a feature designed to prevent redeployment of storage devices with unauthorized configuration profiles or settings. A storage device (e.g., 110) may include a physical input device, a memory, and a controller and may include programmable settings that may be managed by a user. However, there may be configuration profiles only available to a privileged user due to data security or other reasons. For example, such profiles may be set or changed only when a privileged security access code is verified or only when a storage device is in a privileged mode. A controller (e.g., 258) may set a storage device to an exclusive mode or a nonexclusive mode or may change an exclusive mode to a nonexclusive mode and vice versa. In one aspect, this may occur while a storage device is in a privileged mode. In one aspect, this may be performed by the controller based on a control input and a determination of a privileged user. In one advantageous implementation, the control input may be received from a physical input device (e.g., a keypad) of the storage device. In alternative examples, the control input may be received from software or other means. When a storage device is in an exclusive mode, the ability to reset and redeploy the storage device (with unauthorized settings or settings that are against a company's security policy) is restricted. For example, such ability may be restricted to a privileged user and require authentication via a control signal (e.g., a privileged security access code) to allow the storage device to accept new settings/profiles and operate normally. In alternative examples, this functionality may be configured so the storage device can be reset by a restricted user but only to their default settings.

In one or more aspects, implementing an exclusive mode is advantageous as it may address various issues companies may experience with portable secure storage devices.

One issue may be unauthorized users modifying a company's security policy of storage devices. Implementing an exclusive mode would prevent an unauthorized user from resetting and redeploying a portable secure storage device. This would prevent an unauthorized user from modifying a company's existing device security policy that has been placed into the device by a privileged user. Such security policy may include, for example, a privileged access code, a restricted access code, a minimum access code length, an auto-lock setting, a lock-override setting, and the allowed number of unsuccessful security access code entry attempts. In one aspect, an unauthorized user may be a user who does not have the correct privileged security access code to the storage device.

Another issue may be the effectiveness of device whitelisting. When an exclusive mode is not implemented, once the unauthorized user has the physical possession of a whitelisted storage device, he or she could reset and redeploy the device, setup a new privileged access code and start using the device as his or her own device on a company's secure network. When an exclusive mode is implemented on a storage device, the device cannot be reset and redeployed without the control signal (e.g., a valid privileged security access code). This would prevent an unauthorized user, who does not have the control signal, from resetting and redeploying a whitelisted device and starting to use it with different, unauthorized settings or settings that are against a company's security policy. Implementing an exclusive mode would make the device whitelisting protection more effective.

In one or more aspects, the subject technology may be carried out, for example, by one or more of the following:

A method comprising one or more methods or operations described herein.

An apparatus or a portable storage device comprising one or more memories or registers (e.g., 232, 240) and one or more processors (e.g., 258) coupled to the one or more memories, the one or more processors configured to cause the apparatus to perform one or more methods or operations described herein.

A hardware apparatus comprising circuits (e.g., 258, 246, 244) configured to perform one or more methods, operations, or portions thereof described herein.

An apparatus or a portable storage device comprising means (e.g., 258, 246, 244) adapted for performing one or more methods or operations described herein.

A computer-readable storage medium (e.g., 240, one or more memories, one or more registers, and/or one or more media) comprising instructions stored therein, the instructions comprising code for performing one or more methods or operations described herein.

A computer-readable storage medium (e.g., 240, one or more memories, one or more registers, and/or one or more media) storing instructions that, when executed by one or more processors (e.g., 258), cause one or more processors to perform one or more methods, operations or portions thereof described herein.

An apparatus or a portable storage device comprising means (e.g., 258, 246, 244) for performing one or more operations described with reference to FIGS. 3, 4, and/or 5 or one or more operations described herein.

While detailed description is provided above, one or more alternative implementations may utilize other modes, and one or more alternative implementations may utilize other modes, methods and paths to enter into or exit from a mode, such as a renewed mode.

In one aspect, a method may be an operation, an instruction, or a function and vice versa. In one aspect, a clause or a claim may be amended to include some or all of the words (e.g., instructions, operations, functions, or components) recited in one or more sentences, one or more phrases, one or more paragraphs, and/or one or more claims. A claim may have multiple dependencies based on any of the other claims.

An example of the present disclosure may be an article of manufacture in which a non-transitory machine-readable medium (such as microelectronic memory, e.g., 240) has stored thereon instructions (e.g., in firmware) which program one or more data processing components (e.g., the controller 258, or a processor) to perform one or more operations described herein. In other examples, some of these operations may be performed by specific hardware components that contain hardwired logic. Those operations may alternatively be performed by any combination of programmed data processing components and fixed hardwired circuit components.

In some cases, an example of the present disclosure may be an apparatus (e.g., a secure flash storage device) that includes one or more hardware and firmware/software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

The term "machine-readable storage medium," "computer readable medium" or "medium" may refer to any medium or media (e.g., 240) that participate in providing instructions to a processor or controller (e.g., 258) for execution. Such a medium may take many forms, including, but not limited to, non-volatile media and volatile media. Non-volatile media include, for example, optical or magnetic disks, such as a data storage unit. Volatile media include dynamic memory. To illustrate the interchangeability of hardware, firmware and software, items such as the various illustrative blocks, modules, components, methods, operations, instructions, and algorithms have been described generally in terms of their functionality. Whether such functionality is implemented as hardware, firmware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" controller may refer to one or more controllers. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, contain or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions. The term coupling, connecting, or the like is intended to include direct and indirect coupling and direct and indirect connecting. The term coupled, connected, or the like is intended to include directly and indirectly coupled and directly and indirectly connected.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. Unless explicitly stated otherwise, these may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The entire content of U.S. patent application Ser. No. 15/286,465 is incorporated herein by reference.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A portable secure storage device that is self-convertible from a current mode to a renewed mode, comprising:
   a casing;
   a memory disposed within the casing and configured to store encrypted information;
   an input device disposed at the casing, configured to receive a privileged security access code, and configured to receive a restricted security access code;
   an output device disposed at the casing and configured to provide an output;
   a controller disposed within the casing and coupled to the input device, wherein the controller is configured to cause:
      unlocking the portable secure storage device based on the privileged security access code or the restricted security access code; and
      locking the portable secure storage device based on a request, a status, an occurrence of a first event, or an omission of a second event;
   wherein the controller is configured to cause:
      storing a privileged access code in the controller;
      storing a restricted access code in the controller;
      receiving a first input via the input device;

in response to the first input, self-determining, without communicating with a host, whether a request is made to self-convert the portable secure storage device from the current mode to the renewed mode, wherein the host is separate and distinct from the portable secure storage device;

self-determining, without communicating with the host, whether the portable secure storage device is in an exclusive mode or a nonexclusive mode;

when the request is made, when the portable secure storage device is in the exclusive mode, and when the privileged security access code received at the input device is verified against the stored privileged access code:

self-converting, without communicating with the host, the portable secure storage device from the current mode to the renewed mode; and when the request is made and when the portable secure storage device is in the nonexclusive mode:

without communicating with the host, without requiring a determination of whether the privileged security access code is verified, and without requiring a determination of whether the restricted security access code is verified, self-converting the portable secure storage device from the current mode to the renewed mode, and wherein:

when the portable secure storage device is in the renewed mode, the stored privileged access code is a nullified privileged access code, wherein the nullified privileged access code is unusable to verify any security access code, which is received at the input device while the portable secure storage device contains the nullified privileged access code, when data is encrypted using an encryption key and stored prior to the portable secure storage device being in the renewed mode, and when the portable secure storage device is in the renewed mode, the portable secure storage device contains a new encryption key that is unusable for decrypting the data encrypted using the encryption key, the restricted security access code is different from the privileged security access code, the restricted security access code is usable to change a less number of configuration profiles of the portable secure storage device than the privileged security access code, the restricted security access code is unusable to convert the portable secure storage device from the exclusive mode to the nonexclusive mode and from the nonexclusive mode to the exclusive mode, and when the portable secure storage device is in the exclusive mode, and when the privileged security access code is not verified, the controller is prevented from converting the portable secure storage device from the current mode to the renewed mode even if the restricted security access code is verified.

2. The portable secure storage device of claim 1, wherein when the portable secure storage device is in the renewed mode:

all access codes in the portable secure storage device are nullified access codes, wherein at least a portion of each of the nullified access codes is not representable by any input enterable at the input device, none of the nullified access codes is usable to verify any security access code received at the input device while the portable secure storage device contains the nullified access codes, none of the nullified access codes contains all zeros, and the all access codes include the stored privileged access code and the stored restricted access code; and all configuration profiles of the portable secure storage device, excluding the all access codes, have predetermined values.

3. The portable secure storage device of claim 1, wherein self-converting the portable secure storage device from the current mode to the renewed mode comprises:

without communicating with the host, setting the stored privileged access code into the nullified privileged access code.

4. The portable secure storage device of claim 3, wherein self-converting the portable secure storage device from the current mode to the renewed mode comprises:

without communicating with the host, setting the stored restricted access code into a nullified restricted access code; and without communicating with the host, setting the encryption key in the portable secure storage device into the new encryption key.

5. The portable secure storage device of claim 4, wherein self-converting the portable secure storage device from the current mode to the renewed mode comprises:

setting all configuration profiles of the portable secure storage device, excluding the nullified privileged access code and the nullified restricted access code, to predetermined values.

6. The portable secure storage device of claim 1, wherein the controller is configured to cause:

prior to the request is made, determining that a second request is made to self-convert the portable secure storage device from a previous mode to the current mode, wherein the current mode is a privileged mode;

verifying the privileged security access code against the stored privileged access code; and self-converting the previous mode to the privileged mode, wherein when the portable secure storage device is in the privileged mode, the portable secure storage device is convertible between the exclusive mode and the nonexclusive mode, wherein when the portable secure storage device is not in the privileged mode, the portable secure storage device is prevented from converting between the exclusive mode and the nonexclusive mode, and wherein after determining that the request is made to self-convert the portable secure storage device from the privileged mode to the renewed mode, the controller is configured to cause self-converting the portable secure storage device from the privileged mode to the renewed mode.

7. The portable secure storage device of claim 1, wherein the current mode is a locked mode, and wherein when the portable secure storage device is in the locked mode, the portable secure storage device is not recognizable by the host even if the portable secure storage device is plugged into the host.

8. The portable secure storage device of claim 7, wherein the portable secure storage device is configured to enter into the locked mode when one or more of the following occur:

the input device receives a second request to lock the portable secure storage device;

power from the host to the portable secure storage device is interrupted;

the portable secure storage device is unplugged from the host;

the portable secure storage device is electrically disengaged from the host in response to a third request;

the portable secure storage device idles for a period of time; or the portable secure storage device is not plugged into the host within a period of time after a security access code received at the input device is verified.

9. The portable secure storage device of claim 1, wherein the current mode is a protected mode, and wherein when the portable secure storage device is in the protected mode, the portable secure storage device contains the new encryption key or another new encryption key, wherein the another new encryption key is unusable for decrypting data encrypted and stored in the memory prior to the portable secure storage device being in the protected mode.

10. The portable secure storage device of claim 9, wherein while not in the protected mode, the controller is configured to store the privileged access code as at least two representations at different locations of the controller, wherein when the portable secure storage device is in the protected mode:

all access codes in the portable secure storage device, except one of the at least two representations, are nullified access codes, wherein the one of the at least two representations is usable to verify the privileged security access code received at the input device; and all configuration profiles of the portable secure storage device, excluding the all access codes, have predetermined values, and wherein when the portable secure storage device converts from the protected mode to the renewed mode, the one of the at least two representations is nullified.

11. The portable secure storage device of claim 10, wherein when the current mode is the protected mode, when the request is made, when the portable secure storage device is in the exclusive mode, and when the privileged security access code received at the input device is verified against the one of the at least two representations, the controller is configured to convert the portable secure storage device from the protected mode to the renewed mode.

12. The portable secure storage device of claim 9, wherein when a count of unsuccessful security access codes entered into the input device exceeds a threshold number, the portable secure storage device is configured to enter into the protected mode.

13. The portable secure storage device of claim 1, wherein when the portable secure storage device is in the renewed mode with the nullified privileged access code and the new encryption key, the controller is configured to accept a request to create a new privileged access code, and the controller is configured to enable processing a new privileged security access code entered at the input device and storing the new privileged security access code as the new privileged access code, and wherein when the controller contains the new privileged access code, the portable secure storage device is no longer in the renewed mode.

14. The portable secure storage device of claim 13, wherein when a second privileged security access code is inputted at the input device and verified against the new privileged access code, the portable secure storage device is configured to facilitate formatting the memory.

15. The portable secure storage device of claim 13, wherein when a second privileged security access code is inputted at the input device and verified against the new privileged access code, the portable secure storage device is configured to enable processing a new restricted security access code entered at the input device and storing the new restricted security access code as a new restricted access code.

16. The portable secure storage device of claim 1, wherein when the portable secure storage device is in the exclusive mode, a concealed mode is disabled, and wherein when the portable secure storage device is in the nonexclusive mode, when the concealed mode is enabled, and when a concealed security access code inputted at the input device is verified:

the controller is configured to set an encryption key in the portable secure storage device into the new encryption key or another new encryption key, wherein the another new encryption key is unusable for decrypting data encrypted and stored in the memory before the another new encryption key is set into the portable secure storage device; and the controller is configured to store the concealed security access code into the portable secure storage device as a new privileged access code, wherein the new privileged access code is usable to verify another privileged security access code entered after the new privileged access code is stored.

17. The portable secure storage device of claim 1, wherein the first input comprises multiple inputs, and wherein prior to the request is made, when a second request is made to enter into an operating mode different from the renewed mode, and the restricted security access code or the privileged security access code is verified, the portable secure storage device is configured to cause unlocking the portable secure storage device and is configured to cause, when a read request from the host is received, decrypting the data encrypted and providing the decrypted data to the host.

18. A portable storage device that is self-transformable to a renewed mode, comprising:

a housing;

a memory disposed within the housing and configured to store information;

an input device disposed at the housing and configured to receive a first security access code, and configured to receive a second security access code;

a controller disposed within the housing and coupled to the input device, wherein the controller is configured to cause:

determining, without communicating with a host, that a request is made to self-transform the portable storage device to the renewed mode, wherein the host is separate and distinct from the portable storage device;

determining, without communicating with the host, whether the portable storage device is in an exclusive mode or a nonexclusive mode;

when the portable storage device is in the exclusive mode, and only when the first security access code is verified:

self-transforming, without communicating with the host, the portable storage device to the renewed mode; and when the portable storage device is in the nonexclusive mode:

without requiring communication with the host, without requiring verification of the first security access code, and without requiring verification of the second security access code, self-transforming the portable storage device to the renewed mode, and wherein:

when the portable storage device is in the renewed mode, all access codes in the portable storage device are nullified access codes, none of which is usable to verify any security access code received at the input device while the portable storage device contains the nullified access codes, when the portable storage device is in the renewed mode, the portable storage device contains a new encryption key that is unusable for decrypting data encrypted and stored in the memory prior to the new encryption key is set in the portable storage device, the second security access code is different from the first security access code, the second security access code is unusable to convert the portable storage device from the exclusive mode to the nonexclusive mode and from the nonexclusive mode to the exclusive mode, and when the portable storage device is in the exclusive mode, and when the first security access code is not verified, the controller is prevented from transforming the portable storage device to the renewed mode even if the second security access code is verified.

19. A storage device that is self-transformable to a renewed mode, comprising:

a housing;

a memory disposed within the housing and configured to store information;

an input device disposed at the housing and configured to receive a privileged security access code, and configured to receive a restricted security access code;

a controller disposed within the housing and coupled to the input device, wherein the controller is configured to cause:

determining, without communicating with a host, whether the storage device is in an exclusive mode or a nonexclusive mode;

determining, without communicating with the host, whether the storage device is in a privileged mode, a locked mode or a protected mode;

determining, without communicating with the host, whether a request is made to self-transform the storage device to the renewed mode;

when the request is made, and the storage device is in the privileged mode, self-transforming, without communicating with the host, the storage device to the renewed mode, regardless of whether the storage device is in the exclusive mode or the nonexclusive mode;

when the request is made, when the storage device is in the locked mode or the protected mode, and when the storage device is in the nonexclusive mode:

without requiring communication with the host, without requiring a determination of whether the privileged security access code is verified, and without requiring a determination of whether the restricted security access code is verified, self-transforming the storage device to the renewed mode; and when the request is made, and when the storage device is in the protected mode and in the exclusive mode:

self-transforming, without communicating with the host, the storage device to the renewed mode, only when the privileged security access code is verified, and wherein:

when the storage device is transformed into the renewed mode, all access codes in the storage device are nullified access codes, none of which is usable to verify any security access code received at the input device while the storage device contains the nullified access codes, when data is encrypted using an encryption key and stored in the memory prior to the storage device being transformed into the renewed mode, and when the storage device is transformed into the renewed mode, the storage device contains a new encryption key that is unusable for decrypting the data stored in the memory prior to the storage device being transformed into the renewed mode, when the storage device is in the privileged mode, the privileged security access code is verified, and the storage device is convertible between the exclusive mode and the nonexclusive mode, when the storage device is in the locked mode, the storage device is not recognizable by the host even if the storage device is connected to the host, when the storage device is in the protected mode, the storage device contains the new encryption key or another new encryption key, wherein the another new encryption key is unusable for decrypting data encrypted and stored in the memory prior to the storage device being in the protected mode, the restricted security access code is different from the privileged security access code, the restricted security access code is unusable to convert the storage device from the exclusive mode to the nonexclusive mode and from the nonexclusive mode to the exclusive mode, and when the storage device is in the exclusive mode, and when the privileged security access code is not verified, the controller is prevented from transforming the storage device to the renewed mode even if the restricted security access code is verified.

20. The storage device of claim 19, wherein the nullified access codes are not all zeros and are not predetermined values, and wherein when the storage device is transformed into the renewed mode, all configuration profiles of the storage device, excluding the all access codes, have predetermined values.

* * * * *